(12) United States Patent
Ishii et al.

(10) Patent No.: US 9,411,212 B2
(45) Date of Patent: Aug. 9, 2016

(54) ILLUMINATION APPARATUS WHICH IS ARRANGEABLE SO AS TO SURROUND AN IMAGE CAPTURING LENS

(71) Applicant: CANON KABUSHIKI KAISHA, Tokyo (JP)

(72) Inventors: Kenji Ishii, Yokohama (JP); Yoshiharu Tenmyo, Tokyo (JP); Toshiki Miyakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 14/157,749

(22) Filed: Jan. 17, 2014

(65) Prior Publication Data
US 2014/0209796 A1    Jul. 31, 2014

(30) Foreign Application Priority Data

Jan. 25, 2013 (JP) .................................. 2013-012142
Jan. 25, 2013 (JP) .................................. 2013-012272

(51) Int. Cl.
*G03B 15/05*    (2006.01)

(52) U.S. Cl.
CPC ........ *G03B 15/05* (2013.01); *G03B 2215/0575* (2013.01); *G03B 2215/0578* (2013.01); *G03B 2215/0582* (2013.01); *G03B 2215/0592* (2013.01)

(58) Field of Classification Search
CPC ............ G03B 1/00; G03B 7/00; G03B 31/00; G03B 2205/00
See application file for complete search history.

(56) References Cited

U.S. PATENT DOCUMENTS

| 5,345,284 | A |  | 9/1994 | Tsuruta |
| 5,897,201 | A | * | 4/1999 | Simon ....................... F21V 5/00 362/147 |
| 5,926,658 | A |  | 7/1999 | Tenmyo |
| 6,078,752 | A |  | 6/2000 | Tenmyo |
| 6,400,905 | B1 |  | 6/2002 | Tenmyo |
| 6,807,369 | B1 |  | 10/2004 | Tenmyo |
| 6,981,775 | B2 |  | 1/2006 | Tenmyo |

(Continued)

FOREIGN PATENT DOCUMENTS

| CN | 1506745 A | 6/2004 |
| CN | 1667486 A | 9/2005 |

(Continued)

OTHER PUBLICATIONS

May 3, 2016 Chinese Official Action in Chinese Patent Appln. No. 201410032873.0.

*Primary Examiner* — Francis M Legasse, Jr.
(74) *Attorney, Agent, or Firm* — Fitzpatrick, Cella, Harper & Scinto

(57) ABSTRACT

The illumination apparatus includes a light collector directing light from a light source, radially inward further than the light source, and a light guider provided radially inside further than the light source so as to circumferentially extend and guiding the light from the light source toward an area extending to a side away from the light source and causing the light from the light source to exit toward a light projecting direction. The light collector includes two reflective surfaces on a light projecting direction side and on an opposite side thereto in the thickness direction, and a light exiting opening between the two reflective surfaces. In a sectional plane along the thickness direction, a direction of a center of a light exit range from the light collector tilts to the opposite side to the light projecting direction side.

42 Claims, 30 Drawing Sheets

(56) References Cited

U.S. PATENT DOCUMENTS

| | | |
|---|---|---|
| 7,254,323 B2 | 8/2007 | Tenmyo |
| 7,486,885 B2 | 2/2009 | Tenmyo |
| 2004/0120135 A1 | 6/2004 | Tenmyo |
| 2006/0039692 A1* | 2/2006 | Lee ................. G02B 6/0038 396/198 |
| 2006/0083508 A1 | 4/2006 | Tenmyo |
| 2014/0209796 A1 | 7/2014 | Ishii et al. |

FOREIGN PATENT DOCUMENTS

| | | |
|---|---|---|
| CN | 201269491 Y | 7/2009 |
| CN | 201527527 U | 7/2010 |
| CN | 203773211 U | 8/2014 |
| JP | 2001-215574 A | 8/2001 |
| JP | 2006-119385 A | 5/2006 |
| WO | 2004/081648 A2 | 9/2004 |
| WO | 2009/058034 A1 | 5/2009 |

* cited by examiner

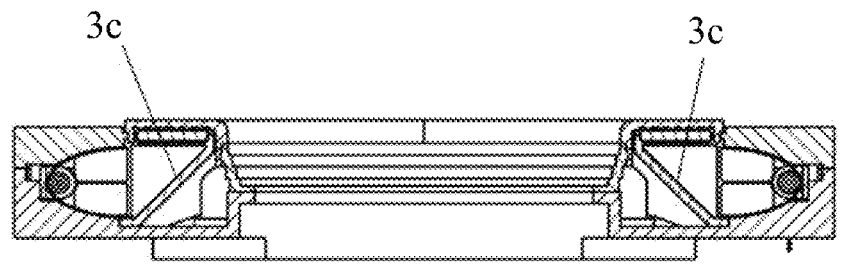
FIG. 11A
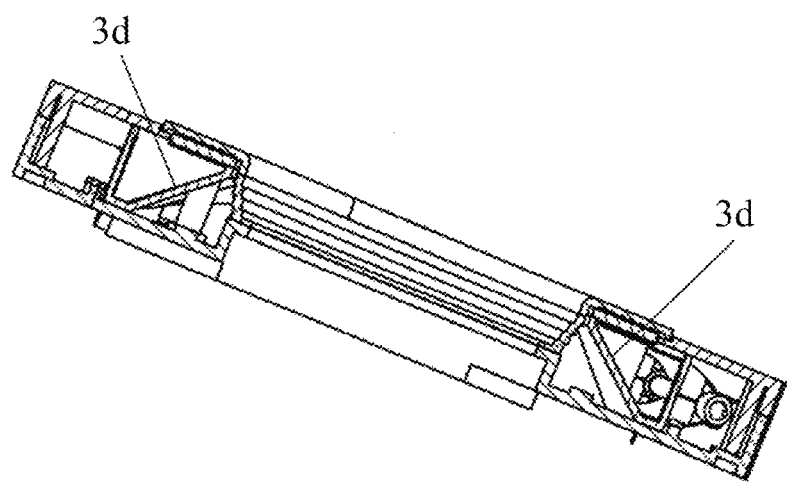
FIG. 11B
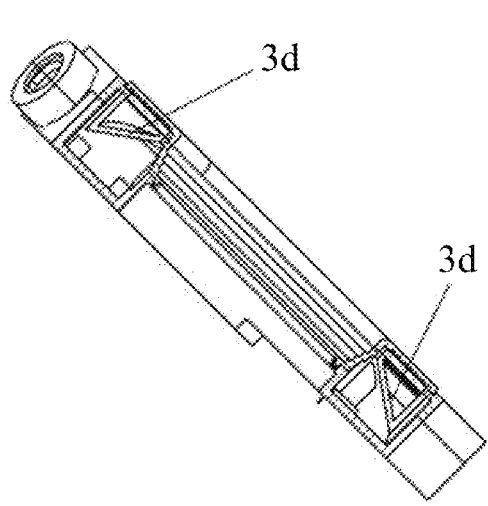 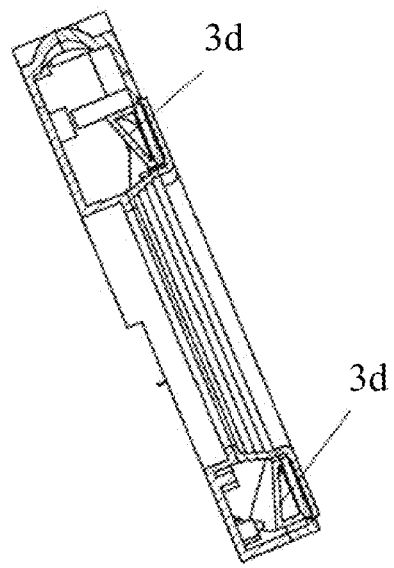
FIG. 11C  FIG. 11D

ILLUMINATION APPARATUS WHICH IS ARRANGEABLE SO AS TO SURROUND AN IMAGE CAPTURING LENS

BACKGROUND OF THE INVENTION

1. Field of the Invention

The present invention relates to an illumination apparatus which is used with an image pickup apparatus such as a digital still camera, and particularly relates to an illumination apparatus which is supported so as to surround an outer circumference of an image capturing lens.

2. Description of the Related Art

In micro photography capturing a close distance object, an illumination apparatus with a light emission portion at a tip of an image capturing lens wherein the light emission portion is formed in a ring shape or an arc shape along an outer circumference of the image capturing lens is often used. Japanese Patent Laid-Open No. 2001-215574 discloses an illumination apparatus having a configuration where light sources such as xenon tubes are formed in a circular arc shape and such multiple light sources are arranged along an outer circumference of an image capturing lens to form a ring shaped light emission portion.

The illumination apparatus disclosed in Japanese Patent Laid-Open No. 2001-215574 uses, as the light source, a glass tube, which is manufactured generally as a straight tube such as a xenon tube, formed in an arc shape (curved tubular shape) through a bending process with high accuracy. As a result, there is a problem that a cost to obtain the light source increases and the illumination apparatus becomes expensive. Furthermore, it is difficult to project light emitted from such curved-tubular light sources efficiently and uniformly onto a target object for micro photography. This causes problems that sufficient performance cannot be exhibit in terms of efficiency of light utilization and light distribution.

Moreover, since such illumination apparatuses are portable to be used with cameras (and interchangeable image capturing lenses), it is desirable that they be formed in a small size as much as possible.

BRIEF SUMMARY OF THE INVENTION

The present invention provides an illumination apparatus having a sufficiently small size and capable of efficiently using light from a light source to perform uniform illumination suitable for micro photography and others without using a curved tubular light source.

The present invention provides as one aspect thereof an illumination apparatus arrangeable so as to surround an image capturing lens. The apparatus includes, when, in a state where the illumination apparatus is arranged so as to surround the image capturing lens, a direction corresponding to a radial direction of the image capturing lens is defined as a radial direction of the illumination apparatus, a direction surrounding the image capturing lens is defined as a circumferential direction of the illumination apparatus, a direction toward an object field to be captured through the image capturing lens is defined as a light projecting direction of the illumination apparatus, and a direction along an optical axis of the image capturing lens is defined as a thickness direction of the illumination apparatus, a light source, a light collector configured to direct light, which diverges from the light source, inward further than the light source in the radial direction by using a reflective surface, and a light guider provided inside further than the light source in the radial direction so as to extend in the circumferential direction and configured to guide the light from the light source toward an area extending to a side away from the light source in the circumferential direction and to cause the light from the light source to exit toward the light projecting direction. The light collector includes two reflective surfaces each as the reflective surface on a light projecting direction side further than the light source and on an opposite side thereto in the thickness direction and a light exiting opening between the two reflective surfaces, and the light collector is configured so that, in a sectional plane along the thickness direction, a direction of a center of an exit range of the light exiting through the light exiting opening tilts to the opposite side to the light projecting direction side inward in the radial direction.

The present invention provides as another aspect thereof an illumination apparatus arrangeable so as to surround an image capturing lens. The apparatus includes, when, in a state where the illumination apparatus is arranged so as to surround the image capturing lens, a direction corresponding to a radial direction of the illumination apparatus is defined as a radial direction of the illumination apparatus, a direction surrounding the image capturing lens is defined as a circumferential direction of the illumination apparatus, a direction toward an object field to be captured through the image capturing lens is defined as a light projecting direction of the illumination apparatus, and a direction along an optical axis of the image capturing lens is defined as a thickness direction of the illumination apparatus, a light source, a light collector configured to direct light, which diverges from the light source, inward further than the light source in the radial direction by using a reflective surface, and a light guider provided inside further than the light source in the radial direction so as to extend in the circumferential direction and configured to guide the light from the light source toward an area extending to a side away from the light source in the circumferential direction and to cause the light from the light source to exit toward the light projecting direction. The light collector includes two reflective surfaces each as the reflective surface on a light projecting direction side further than the light source and on an opposite side thereto in the thickness direction, the two reflective surfaces having shapes along two surfaces symmetric with each other with respect to a plane of symmetry passing through the light source, and the light collector is configured so that the plane of symmetry tilts to the opposite side to the light projecting direction side inward in the radial direction.

The present invention provides as still another aspect thereof an illumination apparatus including a first reflective portion formed to have an arc shape, a light source arranged outside further than the first reflective portion in a radial direction of the first reflective portion, a light collector configured to direct light, which diverges from the light source, inward further than the light source in the radial direction by using a reflective surface, a second reflective portion reflecting the light from the light source to a side away from the light source in a circumferential direction of the first reflective portion, and an exit portion where the light reflected by the first reflective portion exits. The light collector includes, in a direction orthogonal to a plane along the radial direction, a first collective reflective surface provided on a closer side to the exit portion than the light source and a second collective reflective surface provided on a farther side from the exit portion than the light source. The second collective reflective surface has, with respect to a plane passing through the light source along the radial direction, a larger opening angle toward the direction orthogonal to the plane along the radial direction than that of the first collective reflective surface.

The present invention provides as yet still another aspect thereof an illumination apparatus including a first reflective portion formed to have an arc shape, a light source arranged outside further than the first reflective portion in a radial direction of the first reflective portion, a second reflective portion reflecting light from the light source to a side away from the light source in a circumferential direction of the first reflective portion, and an exit portion where the light reflected by the first reflective portion exits. The first reflective portion reflects the light from the light source and the light from the second reflective portion toward the exit portion, the first reflective portion is formed so as to be located closer to the exit portion as being located further away from the light source in the circumferential direction, and in a space facing an opposite side surface of the first reflective portion to an exit portion side surface thereof in a thickness direction of the first reflective portion, at least one of a trigger coil to start light emission of the light source, a light-receiving sensor to detect a light emission amount of the light source and a connector to which a cable making connection to the illumination apparatus is connected is provided.

Further features of the present invention will become apparent from the following description of exemplary embodiments (with reference to the attached drawings).

BRIEF DESCRIPTION OF THE FIGURES

FIGS. 11A to 11D show sectional views corresponding to the cutting planes show in FIG. 10.

DETAILED DESCRIPTION OF THE EMBODIMENTS

Exemplary embodiments of the present invention will be described below with reference to the accompanied figures.

First, prior to a description of illumination apparatuses which are embodiments of the present invention, premise techniques of the illumination apparatuses according to the embodiments will be described as reference examples.

Reference Example 1

Figure 1:
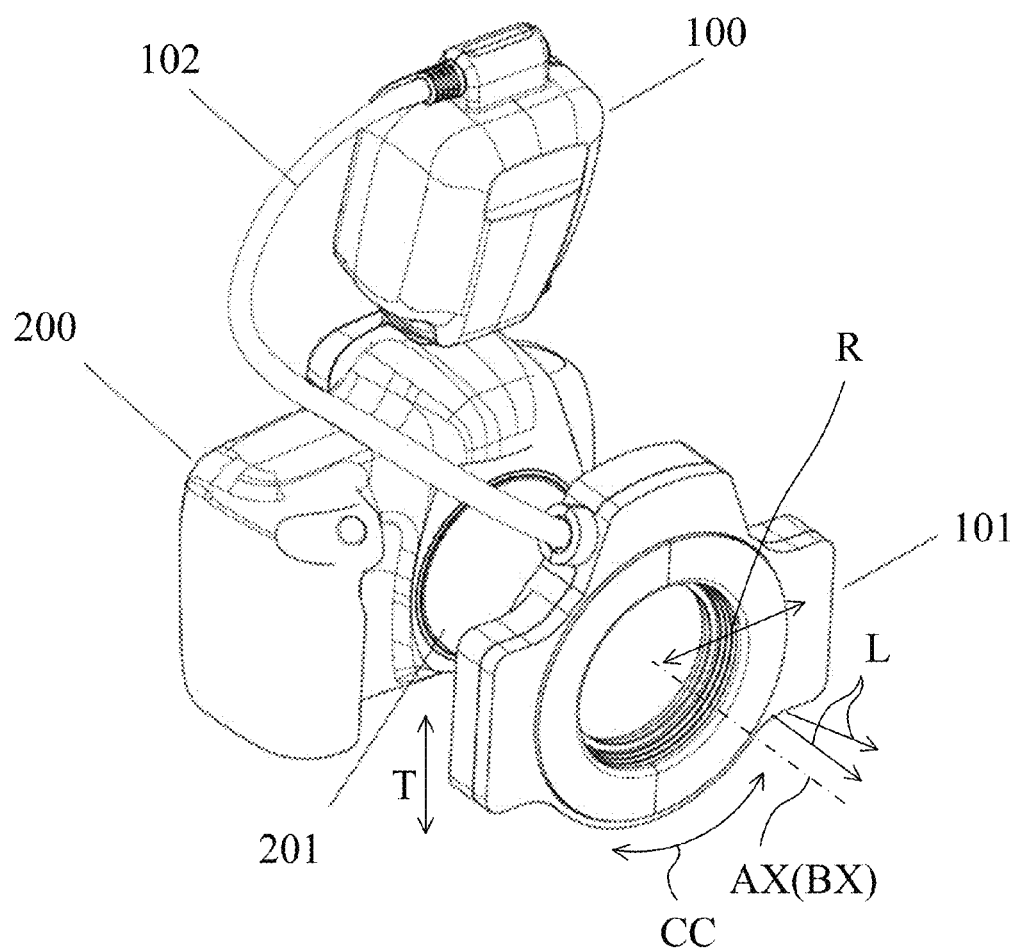
FIG. 1 shows a schematic diagram of an illumination apparatus which is Reference example 1 of the present invention and an image pickup apparatus to which the illumination apparatus is attached.

FIG. 1 shows an illumination apparatus 101 for micro photography which is Reference example 1 of the present invention and an image pickup apparatus (hereinafter referred to as "a camera") 200 to which the illumination apparatus 101 is attached (supported) at a tip portion of an image capturing lens 201 so as to surround an outer circumference thereof. The illumination apparatus 101 is detachably attached to the image capturing lens 201. The image capturing lens 201 may be provided integrally with the camera 200 or may be an interchangeable lens which is detachably attached to the camera 200. The illumination apparatus 101 may be detachably attached to the camera 200 instead of the image capturing lens 201 as long as the illumination apparatus 101 can be supported so as to surround the outer circumference of the image capturing lens 201. In the illumination apparatus 101, a microcomputer for controlling light emission from the illumination apparatus 101, a power source, a main condenser for accumulating light emission energy and others are built-in. Furthermore, the illumination apparatus 101 includes a control unit 100 which is to be detachably attached to the hot shoe (not shown) of the camera 200. The illumination apparatus 101 and the control unit 100 are connected with a connection cable 102.

Although it will be described in detail later, two light sources which emit source light becoming illumination light for micro photography and an illumination optical system which projects the light from the two light sources toward an object field (object) are built-in in the illumination apparatus 101. An assist light emitter which projects assist light to a dark object when performing auto focus in the camera 200 may further be built-in in the illumination apparatus 101.

The illumination apparatus 101 may be attached to the image capturing lens 201 so that the two light sources (which are respectively built-in at portions protruding in a radial direction from a ring shaped portion) are arranged symmetrically as shown in FIG. 1 or may be attached at a position rotated in a circumferential direction of the image capturing lens 201 from the above position. Moreover, a shade may be formed intentionally or a direction in which a shade appears may be selected by a user arbitrarily selecting one of the two light sources and causing only the selected light source to emit light.

Emission control of the illumination light from the illumination apparatus 101 can be performed, for example, as follows. First, preliminary light emission where a certain light amount is continuously projected toward an object for a predetermined time period is performed just before main image capturing to measure a luminance distribution on the object by a photometry sensor which is built-in in the camera 200. Then, by using the measured luminance distribution, the amount of luminance in main light emission performed at the time of the main image capturing is decided by a predetermined algorithm. Combination of such light emission control and so-called divisional photometry enables more rigorous light amount control depending on a condition of the object, especially, light amount control appropriate for micro photography which is likely to be affected by errors in light amount.

Next, a configuration of the illumination apparatus 101 will be described in detail. In the following description, in a use state where the illumination apparatus 101 is attached to the image capturing lens 201 and is supported so as to surround the outer circumference of the image capturing lens 201 as shown in FIG. 1, a direction toward the object field to be captured through the image capturing lens 201 is referred to as "a light projecting direction L" or "a front side" of the illumination apparatus 101. The light projecting direction L includes not only a direction parallel to an optical axis (hereinafter, referred to as "a lens optical axis") AX of the image capturing lens 201, but also directions forming a certain angle with the lens optical axis AX. Moreover, a direction corresponding to a radial direction (direction orthogonal to the lens optical axis AX) of the image capturing lens 201 is referred to as "a radial direction R" of the illumination apparatus 101, and a direction surrounding the outer circumference of the image capturing lens 201 is referred to as "a circumferential direction CC." Furthermore, a direction in which a tangent line of the outer circumference (circle) of the image capturing lens 201 extends is referred to as "a tangent direction T" to the circumferential direction CC. In addition, a direction along the optical axis AX of the image capturing lens 201 is referred to as "a thickness direction" of the illumination apparatus 101.

Figure 2A:
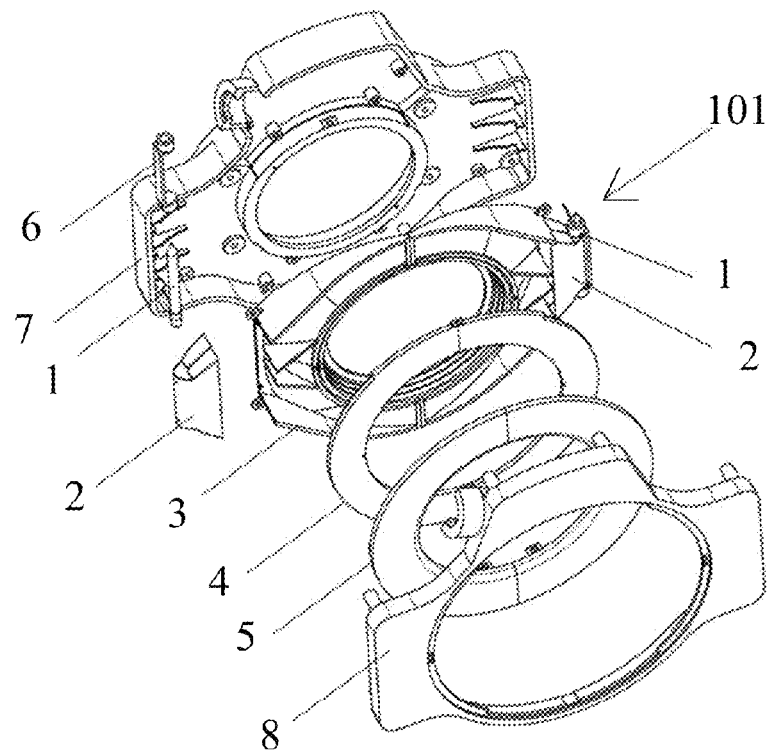
FIGS. 2A and 2B are exploded perspective views of the illumination apparatus of Reference example 1.
Figure 2B:
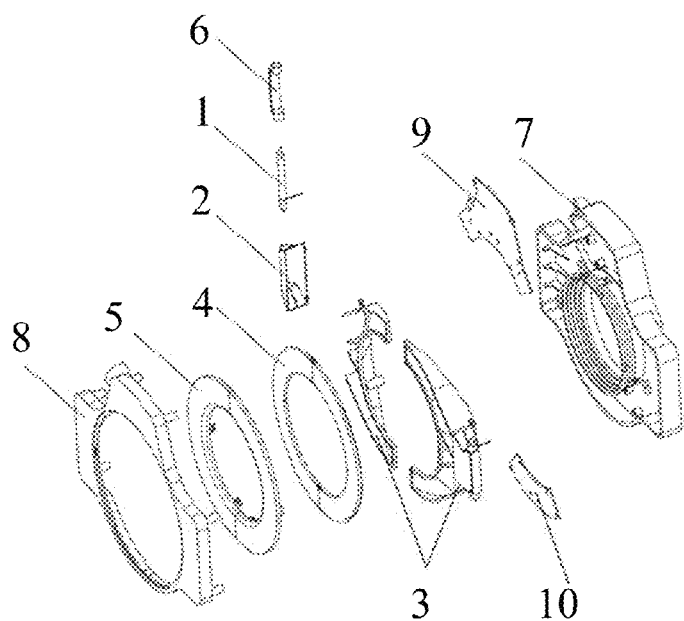
Figure 3:
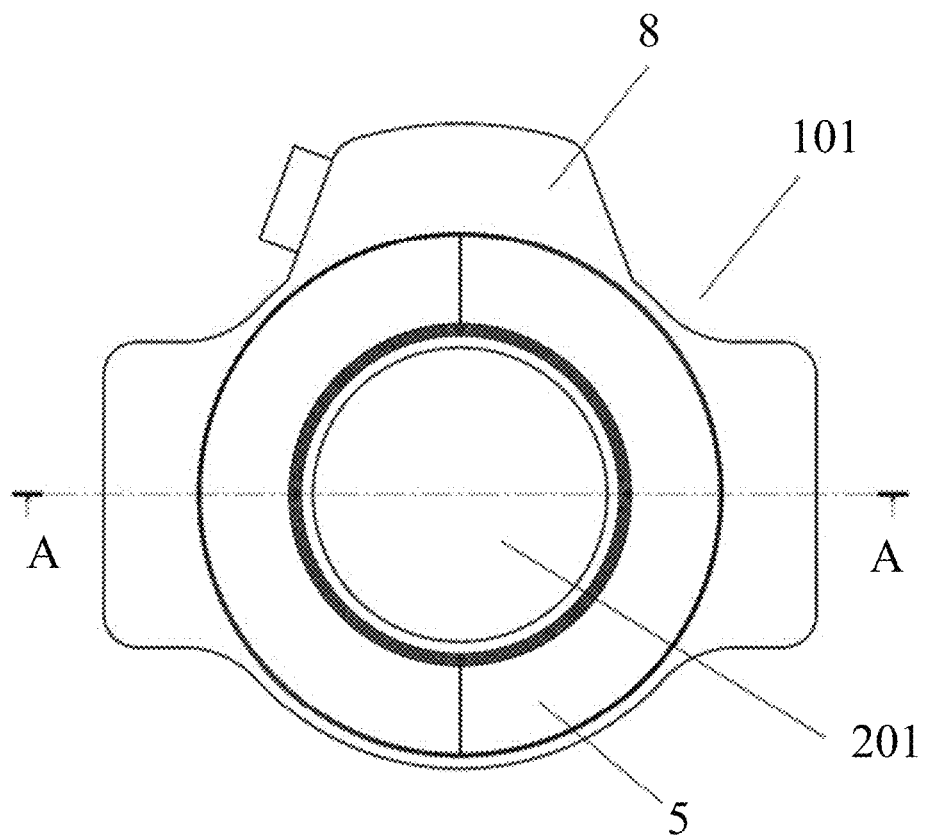
FIG. 3 is a front view of the illumination apparatus of Reference example 1.
Figure 4A:
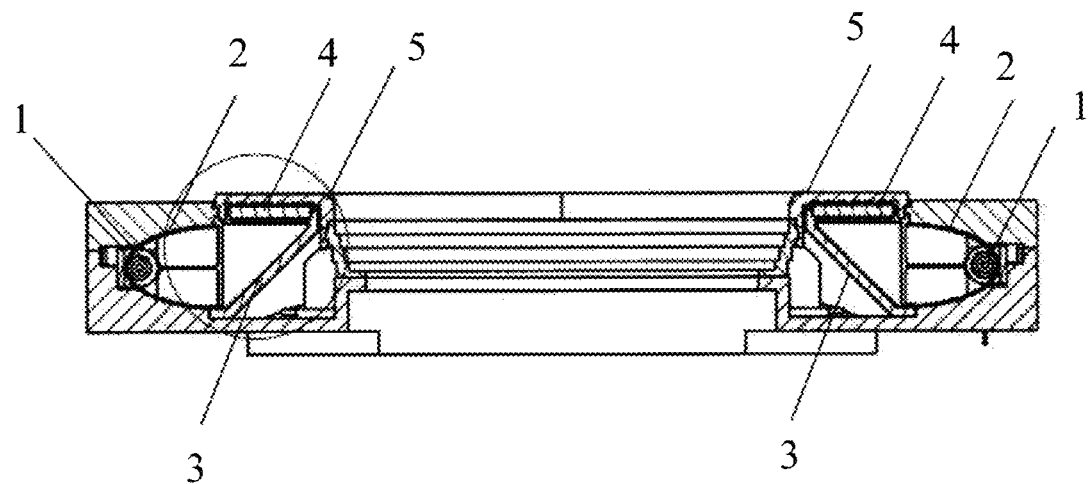
FIGS. 4A and 4B are a sectional view of the illumination apparatus of Reference example 1 and a partially enlarged view thereof.
Figure 4B:
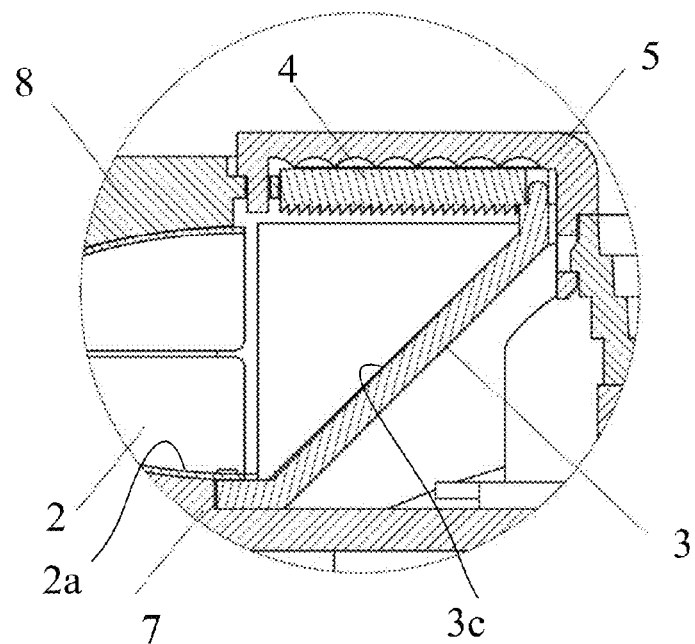
Figure 5A:
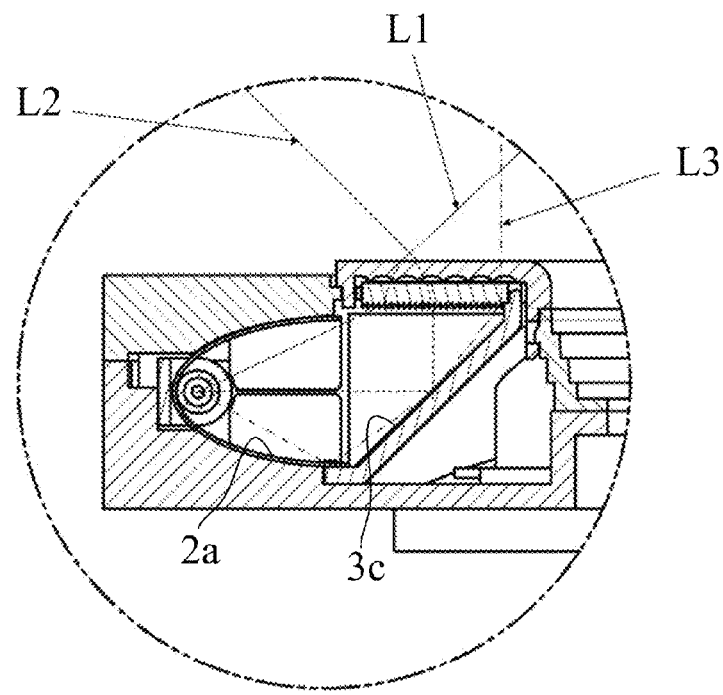
FIGS. 5A and 5B are figures showing optical paths of light rays in the illumination apparatus of Reference example 1.
Figure 5B:
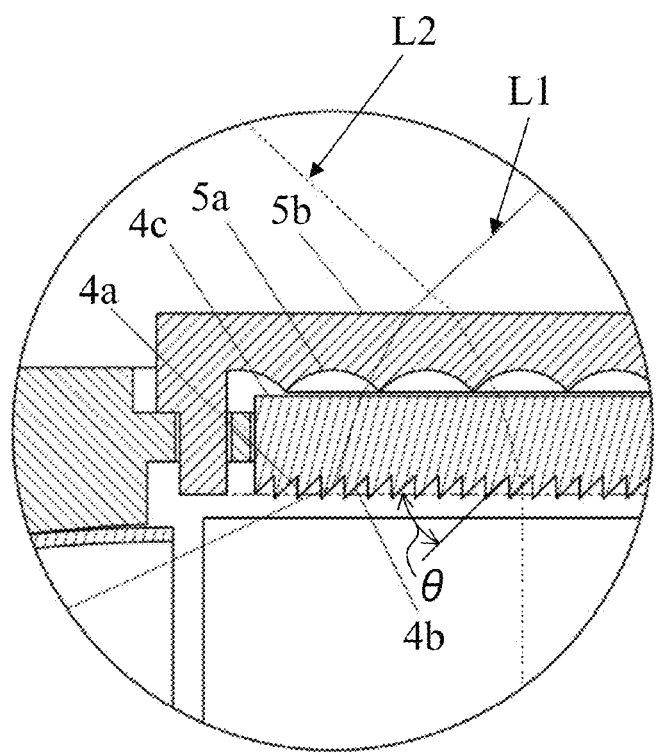
Figure 6A:
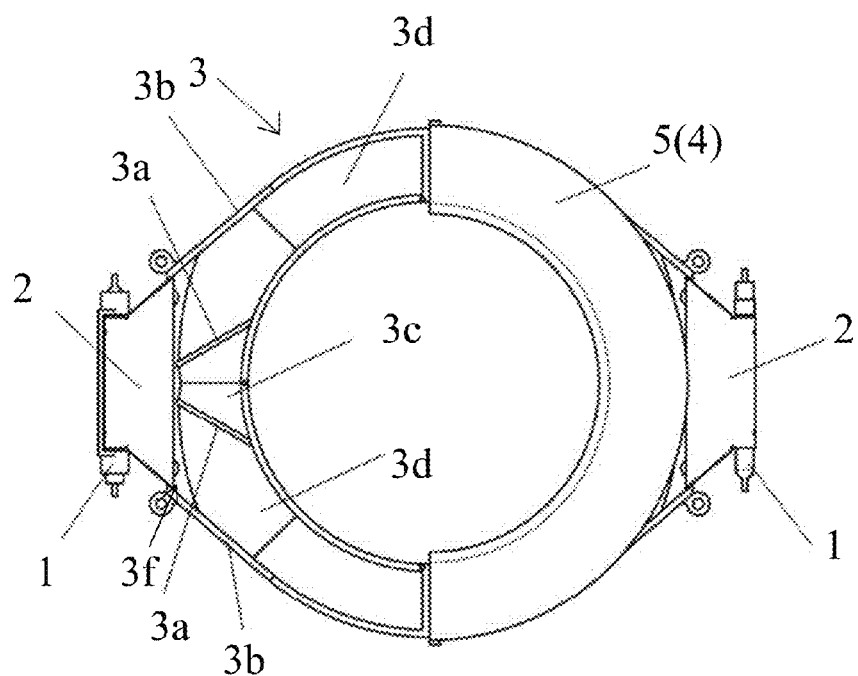
FIGS. 6A and 6B are a front view of an optical system in the illumination apparatus of Reference example 1 and a schematic view of a reflective light collector and an arc reflector used in the optical system.
Figure 6B:
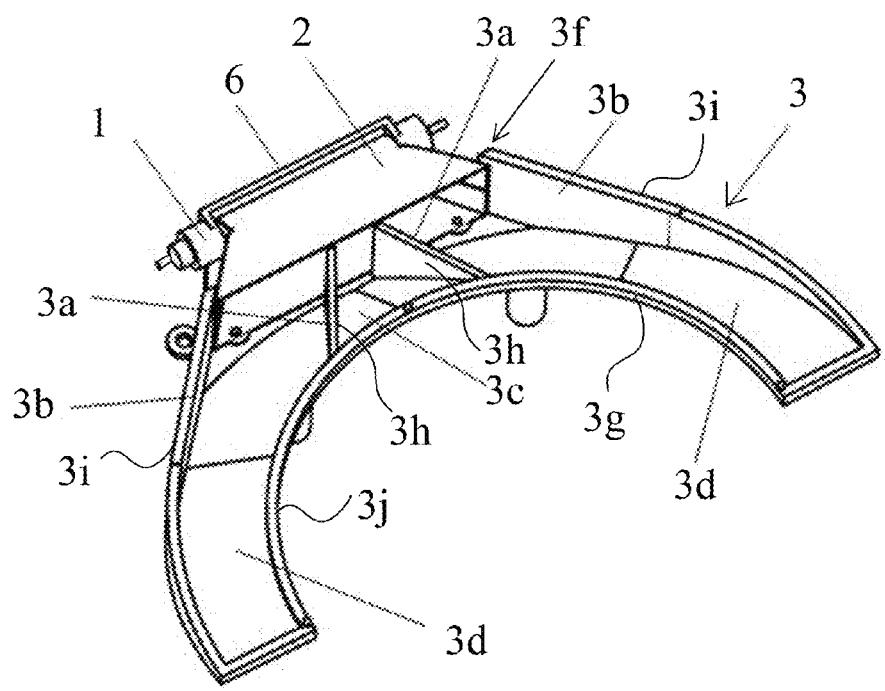

FIGS. 2A and 2B are exploded views of the illumination apparatus 101 when viewed from its diagonally front side. FIG. 3 shows the illumination apparatus 101 when viewed from its front side. FIG. 4A shows a sectional view of the illumination apparatus 101 cut along an A-A line in FIG. 3, and FIG. 4B shows an enlarged view of the circled part in FIG. 4A. FIG. 5A shows optical paths of light rays L1, L2 and L3 which are emitted from a light source 1 described later, and FIG. 5B shows an enlarged view of part of FIG. 5A. Moreover, FIG. 6A shows the illumination optical system constituted by a reflective light collector 2, an arc reflector 3, a prism panel 4 (not shown in FIG. 6A) and a light diffusing panel 5 when viewed from its front side. In the left half of FIG. 6A, the prism panel 4 and the light diffusing panel 5 are removed. FIG. 6B is an enlarged view of the arc reflector 3 when viewed from its diagonally front side.

Figure 7A:
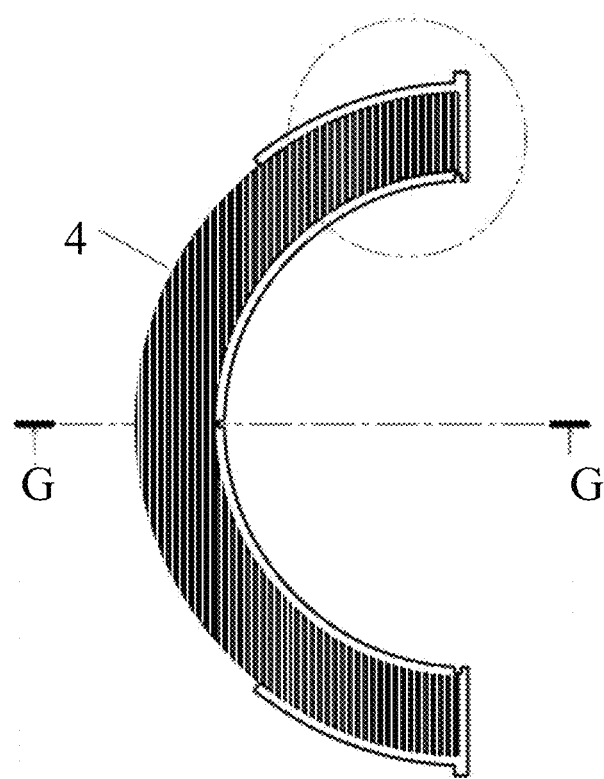
FIGS. 7A and 7B are a back view and a sectional view of a prism panel used in the illumination apparatus of Reference example 1.
Figure 7B:
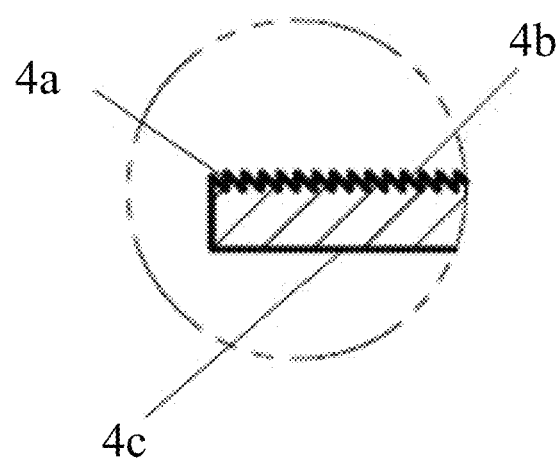
Figure 8A:
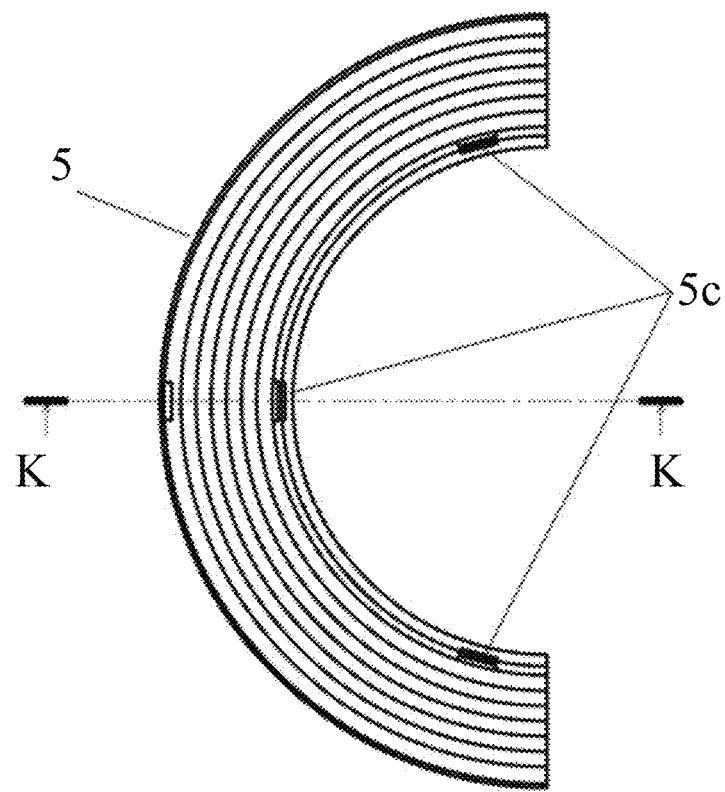
FIGS. 8A and 8B are a back view and a sectional view of a light diffusing panel used in the illumination apparatus of Reference example 1.
Figure 8B:
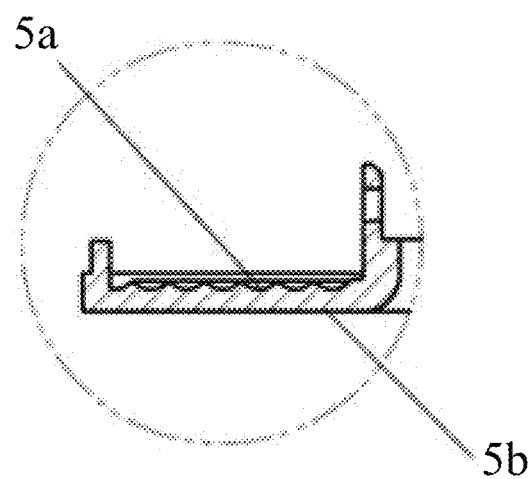
Figure 9:
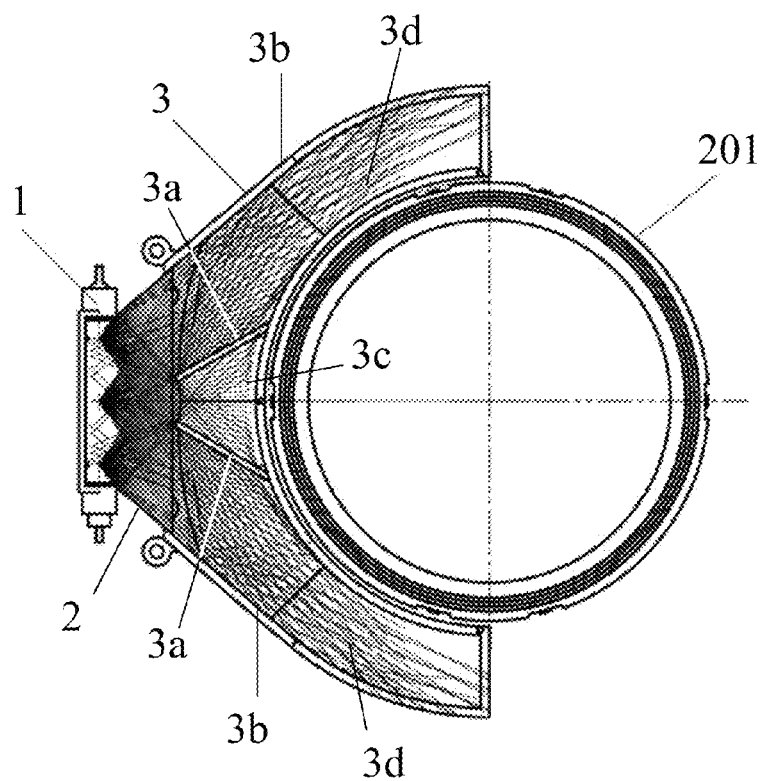
FIG. 9 is a ray tracing chart of the illumination apparatus of Reference example 1.

FIG. 7A shows the prism panel 4 when viewed from its back side (entrance surface side). FIG. 7B shows a sectional view along a G-G line in FIG. 7A. FIG. 8A shows the light diffusing panel 5 viewed from its back side (entrance surface side). FIG. 8B shows a sectional view along a K-K line in FIG. 8A. FIG. 9 shows the light rays emitted from the light source 1 when viewed from the front side.

The illumination apparatus 101 has a symmetric configuration with respect to a center plane (plane of symmetry) which includes a center axis (axis coinciding with the lens optical axis AX in the use state) BX of the illumination apparatus 101 and on both sides of which two light sources are arranged. Therefore, in the following, a configuration of one side (left side) of the symmetric configuration will be described mainly and the other side (right side) of the symmetric configuration will be described as needed.

In Reference example 1, a straight tubular light source such as a discharge light emitting tube (such as a xenon tube) or a cold-cathode tube is used as each of the light sources 1. The light source 1 is arranged so that the longitudinal direction thereof coincides with the tangent direction T. In this reference example, the light sources 1 are respectively arranged on the left side and the right side, and their longitudinal directions coincides with the tangent direction T and are parallel to each other. As each light source 1, a linear light source constituted by multiple LEDs linearly arranged may be used or a single light source which is not a curved-tubular may be used, instead of the straight tubular light source. Inside the illumination apparatus 101, electronic components such as a trigger coil to cause the light source 1 to start light emission, a light-receiving sensor to monitor a light amount emitted from the light source 1 and others are housed.

A reflective light collector 2 includes a reflective surface 2a which reflects, of the light diverging from an entire outer circumference of the light source 1, light proceeding toward directions other than a direction toward the arc reflector 3 and the prism panel 4. Parts of the reflective surface 2a are provided on both sides of the light source 1 in the thickness direction and on both sides of the light source 1 in its longitudinal direction. The reflective surface 2a reflects the light so that it proceeds toward the arc reflector 3 and the prism panel 4 and then emit through a light exit opening formed between edge portions of the reflective surface 2a. Furthermore, the reflective light collector 2 causes, of the light diverging from the light source 1, light which directly proceeds toward the arc reflector 3 and the prism panel 4 to emit through the light exit opening without reflecting that light.

The reflective light collector 2 is manufactured so that the light can be efficiently reflected, by being formed integrally with the reflective surface 2a with a high reflectance material such as bright aluminum or by forming the reflective surface 2a by depositing a metallic material having a high reflectance on an inner surface of a plastic body. The reflective surface 2a of the reflective light collector 2 is formed in an elliptical shape having two focal points in a sectional plane orthogonal to the longitudinal direction of the light source 1 (that is, one tangent direction T of the illumination apparatus 101).

The elliptical shape in the sectional plane of the reflective light collector 2 (reflective surface 2a) is desirable to be set so that one of the two focal points thereof is located at a center in a radial direction of the light source 1 (that is, on a light source side) and the other focal point thereof is located on a first reflective surface (that is, on a first reflective surface side) of the arc reflector 3. Such setting makes it possible to collect, as shown in FIG. 5A, the light reflected by the reflective light collector 2 to cause the light to reach farther. Arbitrarily optimizing the elliptical shape enables adjustment of directivity of the light reflected by the reflective light collector 2, which makes it possible to cause the reflected light to reach sufficiently far even if the reflective light collector 2 is small in size. Thereby, the light can be emitted from a broad area (light exit portion) in the circumferential direction CC and the radial direction R.

The sectional shape of the reflective surface 2a of the reflective light collector 2 may be shapes other than the elliptical shape, such as a quadratic curve shape.

The arc reflector 3 is manufactures by depositing a metallic material having a high reflectance on a plastic main body which is formed in a half circle shape (arc shape) so as to form a ring shape with two arc reflectors. Each of the arc reflectors 3 is provided for each of the two light sources 1 (that is, two arc reflectors 3 are provided in total), and a reflective surface described below is formed in each of the two arc reflectors 3.

As shown in FIGS. 6A and 6B, the arc reflector 3 includes first reflective surfaces 3c and 3d which are formed inside further than the light source 1 in the radial direction R so as to extend in the circumferential direction CC and which reflect the light (including the light reflected by the reflective light collector 2) from the light source 1 in the light projecting direction L. Of the first reflective surfaces 3c and 3d, the first reflective surface 3c is a light source side reflective surface (first area) which is a portion facing a longitudinal central portion of the light source 1. Moreover, of the first reflective surfaces 3c and 3d, the first reflective surface 3d includes two arc reflective surfaces (second areas) formed so as to extend in an arc shape toward both sides from the light source side reflective surface 3c in the circumferential direction CC, that is, so as to extend away from the light source 1 in the circumferential direction CC. In the following description, a space formed between the light source side and arc reflective surfaces 3c and 3d and the prism panel 4 disposed further forward in the light projecting direction L than the reflective surfaces 3c and 3d is referred to as "an optical path area".

The arc reflector 3 includes, in addition to the light source side and arc reflective surfaces 3c and 3d, two second reflective surfaces 3a. As shown in FIG. 9, the second reflective surfaces 3a reflect part of the light that proceeds toward the light source side reflective surface 3c from the light source 1, toward the optical path area extending in directions away from the light source 1 in the circumferential direction CC along the arc reflective surfaces 3d. In a case where no second reflective surface 3a is provided, a larger part of the light emitted from the light source 1 proceeds toward the light source side reflective surface 3c as compared with that proceeding toward the arc reflective surfaced 3d. If such a larger part of the light is reflected by the light source side reflective surface 3c to the light projecting direction L without change, a large light amount difference occurs between a part near the light source 1 of the light exit portion (described later) and a part thereof away from that part in the circumferential direction CC.

Therefore, this reference example provides, between the light source side reflective surface 3c and the two arc reflective surfaces 3d, the two second reflective surfaces 3a like partition walls which partition these reflective surfaces 3c and 3d. In other words, the two second reflective surfaces 3a are disposed so as to be apart from each other in the longitudinal direction of the light source 1 and to be symmetric with respect to a central sectional plane passing through a longitudinal center of the light source 1 and being orthogonal to the longitudinal direction of the light source 1. The two second reflective surfaces 3a are disposed so that a distance between two second reflective surfaces 3a in the circumferential direction CC becomes narrower as being located closer to the light source 1 in the radial direction R.

Of the light proceeding toward the light source side reflective surface 3c from the light source 1, light reflected by one of the two second reflective surfaces 3a proceeds toward the optical path area along one of the arc reflective surfaces 3d. On the other hand, of the light proceeding toward the light source side reflective surface 3c from the light source 1, light reflected by the other one of the two second reflective surfaces 3a proceeds toward the optical path area along the other one of the arc reflective surfaces 3d. Furthermore, of the light proceeding toward the light source side reflective surface 3c from the light source 1, light which is not reflected by the two second reflective surfaces 3a reaches the light source side reflective surface 3c. The positions and shapes of the two second reflective surfaces 3a disposed between the light source side reflective surface 3c and the two arc reflective surfaces 3d are decided so that a light amount emitted from the light exit portion having an arc shape (or a ring shape) becomes uniform. That is, providing the second reflective surfaces 3a at appropriate positions and in an appropriate shape makes it possible to distribute the light proceeding toward the light source side reflective surface 3c from the light source 1 almost uniformly in the entire first reflective surfaces 3c and 3d (first and the second areas).

In addition, reflecting the light distributed uniformly by the first reflective surfaces 3c and 3d to the light projecting direction L causes light with a uniform light amount to proceed to the arc shaped light exit portion which faces the first reflective surfaces 3c and 3d. In such way, the lights from the two light sources 1 are uniformly distributed to the ring shaped light exit portion which extends in the circumferential direction CC by the first reflective surfaces 3c and 3d and the second reflective surfaces 3a, which are provided for each light source 1, and exit to the light projecting direction L. Accordingly, the first reflective surfaces 3c and 3d and the second reflective surfaces 3a serve as a light guider which guides the light from the light source 1 to the areas extending in the directions away from the light source 1 in the circumferential direction CC and which causes the light to exit to the light projecting direction L. The arc reflector 3 will be described more in detail later.

The prism panel (first optical member) 4 is disposed at the light exit portion formed further forward in the light projecting direction L than the arc reflector 3. The prism panel 4 is manufactured so as to have a half circle shape (arc shape) with a light transmissive plastic material having a high light transmittance such as acrylic plastic. Two prism panels 4 are assembled in a ring shape.

In a sectional plane orthogonal to the longitudinal direction of the light source 1, the light (including light reflected by a portion near the light source 1 of the reflective light collector 2 and then returned to the light source 1 to be emitted from the light source 1 again) is divided into four types of light rays which follow mutually different optical paths. FIG. 5A shows three types of light rays L1, L2 and L3 among the four types of light rays. The light ray L1 is emitted from the light source 1 and reaches the prism panel 4 without being reflected by the first reflective surface 3c (3d) of the arc reflector 3. The light ray L2 is emitted from the light source 1 and reaches the prism panel 4 without being reflected by the reflective light collector 2 but with being reflected by the first reflective surface 3c (3d) of the arc reflector 3. The light ray L3 is emitted from the light source 1, reflected by the reflective light collector 2, further reflected by the first reflective surface 3c (3d) of the arc reflector 3 and then reaches the prism panel 4. Although not shown, the light ray L4 is emitted from the light source 1, reflected by the reflective light collector 2 and then reaches the prism panel 4 without being reflected by the first reflective surface 3c (3d) of the arc reflector 3.

In an entrance surface of the prism panel 4, a prism array constituted of multiple minute prism portions is formed. Each prism portion of the prism array extends along the longitudinal direction of the light source 1 (one tangent direction T) and allows, of the among the light from the light source 1, light reaching the prism portion after being reflected by the first reflective surfaces 3c and 3d of the arc reflector 3 to be transmitted therethrough to the light projecting direction L. Furthermore, each prism portion reflects at least light reaching without being reflected by the first reflective surfaces 3c and 3d to the light projecting direction L. Specifically, as shown in FIGS. 5A and 5B, each prism portion includes a first surface 4a where the light ray L1 enters and a second surface 4b where the light rays L2 and L3 enter. The light ray L4, which is not shown, also enters the first surface 4a. When a plane along the radial direction R is defined as a reference plane as indicated by a dashed-dotted line in FIG. 5B, an angle of the first surface 4a forming with the reference plane (in this reference example, 90°) is larger than an angel θ of the second surface 4b forming with the reference plane.

The light rays L2 and L3 entering the second surfaces 4b are refracted thereat, transmitted through the prism panel 4 and then refracted at an exit surface (flat surface) 4c to exit therefrom to the light projecting direction L (that is, a light diffusing panel (5) side). When the light rays L2 and L3 reach the second surface 4b at a position near the light source 1, as shown in FIGS. 5A and 5B that show the light ray L2 as an example, they enter at small incident angles with respect to the second surface 4b. Therefore, these light rays L2 and L3 are refracted at the second surface 4b so as to be inclined in a direction away from the center axis BX to the radial direction R and then exit from the prism panel 4. When the light rays L2 and L3 reach the second surface 4b at a position apart from the light source 1, as shown in FIG. 5A that shows the light ray L3 as an example, they enter the second surface 4b at large incident angles. Therefore, these light rays L2 and L3 are refracted approximately in parallel with the center axis BX at the second surface 4b and then exit from the prism panel 4.

On the other hand, the first surface 4a refracts the entering light ray L1 (L4) to direct it toward the second surface 4b. The second surface 4b is formed so as to satisfy a total reflection condition for the light ray L1 (L4). Therefore, the light ray L1 is internally totally reflected at the second surface 4b to be transmitted through the prism panel 4 and exits from the exit surface 4c to the light projecting direction L (light diffusing panel (5) side). In such way, the prism portion directs especially the light ray L1 reaching the prism portion without being reflected by the first reflective surface of the arc reflector 3 to the light projecting direction L, which improves use efficiency of the light emitted from the light source 1.

Depending on a position in the circumferential direction CC where the light ray (L1, L4) enters the prism panel 4, an exit angle of the light ray exiting from the prism panel 4 varies. When tilt angles of the first and second surfaces 4a and 4b are the same in the entire prism array, an incident angle of the light ray entering the first surface 4a near the light source 1 is larger than that of the light ray entering the first surface 4a apart from the light source 1. Therefore, the exit angle from the exit surface 4c of the former light ray is greater than that of the latter light ray. In such way, an exit direction of the light ray (L1, L4) changes depending on the incident positions of the light rays reaching the prism panel 4 and on distances from the light source 1. However, an entire light flux that is a bundle of the light rays is converted into a light flux with a uniform light amount distribution in a range from a direction parallel to the center axis BX to a direction slightly inward in the radial direction R.

In this reference example, as shown in FIG. 5B, the tilt angle θ of the second surfaces 4b forming with the reference plane (indicated by the dashed-dotted line in the figure) along the radial direction R is 42.5° which is constant throughout the entire prism array. In such case, setting the incident angle (angle forming with a normal line to the reference plane) of the light ray (L1, L4) reaching the prism panel 4 to 47.5° or greater makes it possible to cause the light ray to enter the prism portion from the first surface 4a and to cause it to internally totally reflect at the second surface 4b and exit from the prism panel 4. On the other hand, setting the incident angle of the light ray (L2, L3) reaching the prism panel 4 to a smaller angle than 47.5° makes it possible to cause the light ray to enter the prism portion from the second surface 4b and to cause it to refract without being internally totally reflected to exit from the prism panel 4.

The tilt angle θ of the second surface 4b is not limited to 42.5°, and the angle of the first surface 4a forming with the reference plane is also not limited to 90°. In other words, these angles may be other angles.

Furthermore, the prism array constituted of the prism portions extending along the longitudinal direction of the light source 1 does not need to be formed on the entire entrance surface of the prism panel 4, and may be formed in at least a partial area near the light source 1.

A light diffusing panel (second optical member) 5 is arranged further forward in the light projecting direction L than the prism panel 4 in the light exit portion. The light diffusing panel 5 is manufactured with a light transmissive plastic material having a high transmittance such as acrylic plastic, and two light diffusing panels 5 are assembled in a ring shape. In an entrance surface of each light diffusing panel 5, as shown in FIGS. 5A and 5B, multiple cylindrical lens portions (light diffusive portions) 5a are concentrically formed so as to each extend in an arc shape in the circumferential direction CC. Each cylindrical lens portion 5a has a function of diffusing light rays entering it by refracting the light rays toward the radial direction R. The light rays refracted by the cylindrical lens portion 5a exit from an exit surface 5b of the light diffusing panel 5 to be projected on the object field (object).

In such way, the light diffusing panel 5 diffuses toward the radial direction R the light which is emitted from the light source 1 and proceeds to the circumferential direction CC and whose direction is changed to the light projecting direction L by the arc reflector 3 or the prism panel 4. Accordingly, a light amount distribution of the illumination light can be made uniform in the radial direction R while increasing a size in the radial direction R of a light projection range that is an object side range where the illumination light is projected to a size suitable for micro photography with almost no change in the exit direction of the light exiting from the prism panel 4 in the circumferential direction CC. Combination of such a light diffusing panel 5 and the prism panel 4 makes it possible to efficiently guide the light from the light source 1 to the light projection range suitable for micro photography and to perform illumination with a uniform light distribution within the light projection range.

Reference numeral 6 denotes an elastic holder to fix the light source 1 with respect to the reflective light collector 2. Reference numeral 7 denotes a back cover to hold mount substrates 9 and 10 on which the above-mentioned members constituting the illumination optical system and the above-mentioned electronic components are mounted. Reference numeral 8 denotes a front cover which covers the light sources 1 and the reflective light collectors 2 in a front face of the illumination apparatus 101 and which includes a circular opening exposing the light exit portion where the two prism panels 4 and the two light diffusing panels 5 are arranged. At an inner circumferential portion of the opening of the front cover 8, engaging portions to holding the prism panels 4 and the light diffusing panels 5 are formed.

The reflective light collector(s) 2 and the light source(s) 1 thereinside are covered with the front cover 8, so that they cannot be seen through the light diffusing panels 5 and the prism panels 4 from the front side of the illumination apparatus 101.

Next, the shape and others of the arc reflector 3 will be described in detail with reference to FIGS. 6A and 6B. The arc reflector 3 includes an entrance opening 3f into which an outer surface of the reflective light collector 2 near the light exit opening is fit and an arc shaped bottom portion 3g on which the light source side and arc reflective surfaces 3c and 3d as the first reflective surfaces are formed by metal deposition. The light source side reflective surface 3c is formed as part of a conical surface having a tilt angle of 45° with respect to the reference plane along the radial direction R in the above-mentioned central sectional plane passing through the longitudinal center of the light source 1.

Figure 10:
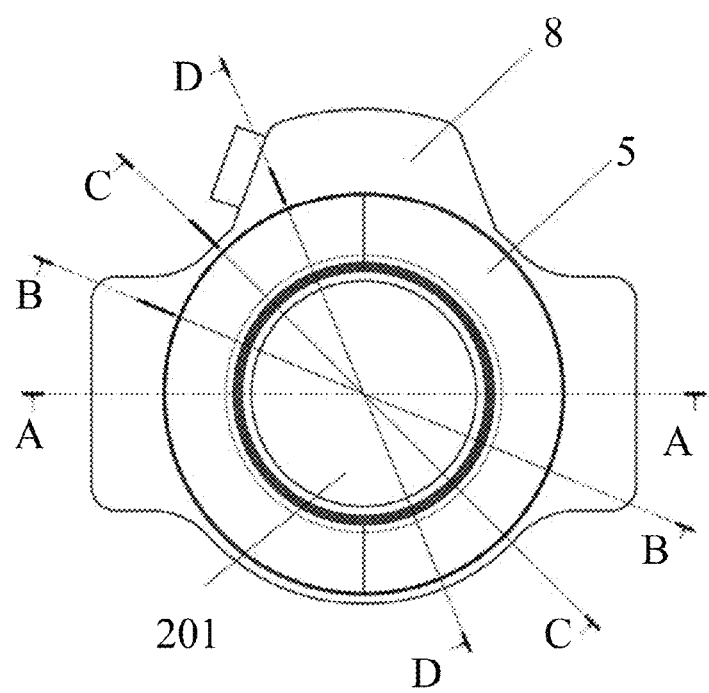
FIG. 10 shows positions of cutting planes in the illumination apparatus of Reference example 1.

Each of the arc reflective surfaces 3d is formed, basically, as a surface tilted with respect to the reference plane along the radial direction R so as to be located further forward in the light projecting direction L (that is, so as to increase its height in the light projecting direction L) as being located away from the light source 1 (and the reflective light collector 2) in the circumferential direction CC. However, in this reference example, as shown in FIGS. 11A to 11D which are sectional views respectively corresponding to A-A, B-B, C-C and D-D lines in FIG. 10, positions (heights) in the light projecting direction L are different between an inner circumferential side portion and an outer circumferential side portion of the arc reflective surface 3d in the radial direction R (specifically, the inner circumferential side portion is higher than the outer circumferential side portion). Moreover, the arc reflective surface 3d is formed as a twisted spiral surface in which a height of its outer circumferential side portion increases as being located away from the reflective light collector 2 in the circumferential direction CC while maintaining a higher height of its inner circumferential side portion than that of the outer circumferential side portion. This is to prevent concentration of light on the outer circumferential side portion of the arc reflective surface 3d causing reduction of light proceeding toward the inner circumferential side portion thereof. That is, providing a higher height to the inner circumferential side portion of the arc reflective surface 3d than that of the outer circumferential side portion thereof from a close side to the reflective light collector 2 (and the light source 1) positively guides the light reaching the arc reflective surface 3d to the light exit portion (that is, the prism panel 4). Thereby, light with a uniform light amount distribution exits from the arc shaped (ring shaped) light exit portion to the light projecting direction L.

The arc reflector 3 further includes two partition walls 3h on which the two second reflective surfaces 3a, which are disposed between the light source side reflective surface 3c and the two arc reflective surfaces 3d, are formed by metal deposition.

The arc reflector 3 further includes outer circumferential wall portions 3i which respectively extend along outer circumferences of the two arc reflective surfaces 3d and whose inner circumferential surfaces are formed as outer circumferential reflective surfaces 3b by metal deposition. As can be seen in FIG. 9, part of the light that is reflected by the second reflective surfaces 3a proceeds to the optical path area along the arc reflective surfaces 3d after being reflected by the outer circumferential reflective surfaces 3b. Such a configuration makes it possible to cause the light from the light source 1 to reach the optical path area further away in the circumferential direction CC from the light source 1. In addition, there is also light reaching the outer circumferential reflective surfaces 3b directly from the light source 1 or the reflective light collector 2 to be reflected thereby. The outer circumferential reflective surfaces 3b can cause such light to reach areas of the prism panel 4 further away in the circumferential direction CC from the light source 1.

The outer circumferential reflective surfaces 3b also prevent the light emitted from the light source 1 from leaking outside the arc reflector 3.

Furthermore, the arc reflector 3 includes an inner circumferential wall portion 3j extending along inner circumferences of the light source side reflective surface 3c and the two arc reflective surfaces 3d. On an inner surface of the inner circumferential wall portion 3j, a reflective surface is also formed by metal deposition. The light exit portion which is an arc shaped (ring shaped) opening formed between the inner circumferential wall portion 3j and the outer circumferential wall portion 3i has a substantially same shape as arc shaped outer circumferences of the prism panel 4 and light diffusing panel 5. Thereby, the light emitted from the light source 1 can be guided efficiently to the prism panel 4 and the light diffusing panel 5.

Part of the outer circumferential wall portion 3i near the light exit opening of the reflective light collector 2, that is, part thereof from the light source 1 to the arc reflective surface 3d extends in the tangent direction of the arc shaped outer circumferences of the prism panel 4 and light diffusing panel 5. Thereby, the light from the light source 1 can be used efficiently without being blocked.

Next, a supplemental description will be given for the prism panel 4. As described above, the entrance surface (light source (1) side surface) of the prism panel 4 is formed so that the multiple prism portions each extending along the longitudinal direction of the light source 1 form the prism array. Each prism portion is provided with the first surface 4a formed on the closer side to the light source 1 and serving as a transmissive surface and the second surface 4b formed at the back of the first surface 4a (on the farther side from the light source 1) and serving as a transmissive surface and an internal total reflective surface.

Figure 12:
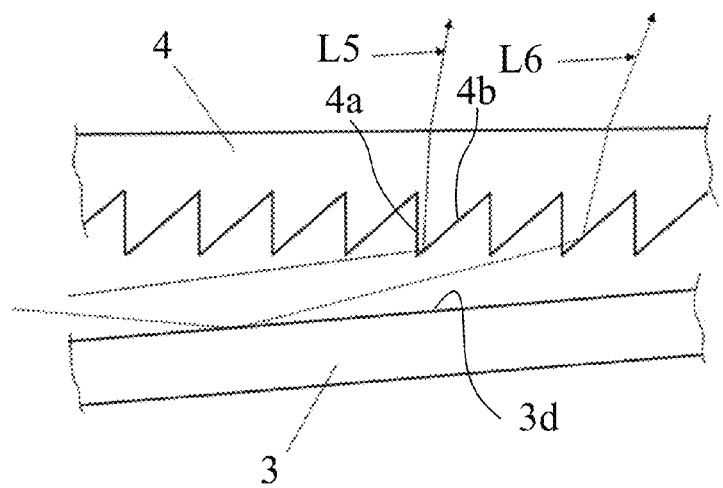
FIG. 12 shows light rays at the light emission portion of the illumination apparatus of Reference example 1.

As shown in FIG. 12, most of the light (light rays L5 and L6) distributed toward the both sides in the circumferential direction CC by the two second reflective surfaces 3a of the arc reflector 3 to proceed toward parts of the optical path area far away from the light source 1 enters the prism portions from their first surfaces 4a. Then, the entering light is internally totally reflected at the second surfaces 4b, thereby its direction is changed drastically, and then the light exits to the light projecting direction L. The light ray L5 is reflected by the second reflective surface 3a and reaches the first surface 4a without being reflected by the arc reflective surface 3d. The light ray L6 is reflected by the second reflective surface 3a, further reflected by the arc reflective surface 3d and then reaches the first surface 4a. The light reaching the first surfaces 4a rarely returns to an arc reflector (3) side again.

In such way, almost all of the light guided to the parts of the optical path area far away from the light source 1 by the reflection by the second reflective surfaces 3a of the arc reflector 3 enters the prism panel 4 (prism portions) from the first surfaces 4a, which is different from the light in part of the optical path area near the light source 1. Then, the direction of the light is changed at the second surfaces 4b, and the light efficiently exits to the light projecting direction L. Although the light exiting from the prism panel 4 enters the cylindrical lens portions 5a formed in the light diffusing panel 5 so as to extend in the circumferential direction CC, light exiting from an area of the prism panel 4 far away from the light source 1 is less likely to be affected by a refractive power of the cylindrical lens portion 5a and therefore exits from the light diffusing panel 5 to the light projecting direction L without drastic change of its proceeding direction from that when exiting from the prism panel 4.

Accordingly, as long as light uniformly enters the entrance surface (first and second surfaces 4a 4b) of the entire prism panel 4, light having a uniform light amount distribution can be emitted from the entire arc shaped (ring shaped) light exit portion. Furthermore, setting the angle of the first surface 4a forming with the reference plane formed on the light source side to 90° makes it possible to significantly efficiently guide the light emitted from the light source 1 to the light projecting direction L.

Moreover, arbitrarily changing the shape of the arc reflective surface 3d of the arc reflector 3 makes it possible to adjust amounts of light entering each area of the prism panel 4. Thereby, even if a factor causing a light amount unevenness exists in an emission characteristic of the light source 1, a reflection characteristic of the reflective light collector 2 or the like, the light having a uniform light amount distribution can be emitted from the entire light exit portion.

In this reference example, the ring shaped light exit portion is formed by assembling the two arc shaped light exit portions. In this configuration, light from one of the light exit portions compensates for light from the other one of the light exit portions at a boundary between the two light exit portions, which enables uniform illumination of a light projecting area without a discontinuity.

As described above, in this reference example, the reflection of the light from the light source 1 by the first reflective surfaces 3c and 3d of the arc reflector 3 enables forming the light exit portion extending to the circumferential direction, without using a curved-tubular light source. Furthermore, guiding part of the light from the light source 1 to the circumferential direction CC by the second reflective surfaces 3a of the arc reflector 3 enables the light from the light source 1 to uniformly exit from the light exit portion. Thereby, an illumination apparatus can be achieved which is capable of efficiently utilizing the light from the light source 1 and performing uniform illumination suitable for micro photography.

Although the light exit portion of the illumination apparatus has a ring shape (circle shape) in this reference example, the light exit portion may have a rectangular shape or a polygonal shape. In such a case, a direction corresponding to the radial direction of the image capturing lens (for example, a direction in which diagonal lines of the rectangular shape or the polygonal shape extend) can be defined as the radial direction of the illumination apparatus, and a direction surrounding the outer circumference of the image capturing lens can be defined as the circumferential direction of the illumination apparatus.

Furthermore, in this reference example, the height of the arc reflective surface 3d of the arc reflector 3 in the light projecting direction L changes smoothly in the circumferential direction CC. However, the height may change in a step manner, and a width of the arc reflective surface 3d may change with the height. Furthermore, although the arc reflective surface 3d of the arc reflector 3 is formed as a twisted spiral surface in this reference example, it may be formed as a spiral surface without twist.

In addition, in this reference example, description was given for the case where the two light sources are arranged in the circumferential direction CC and two illumination optical systems each constituted by the reflective light collector 2, the first reflective surfaces 3c and 3d, the second reflective surfaces 3a, the prism panel 4 and the light diffusing panel 5 are configured for the two light sources 1. However, the number of the light sources and the number of the illumination optical systems are not limited to two, and may be one or plural more than two.

Moreover, the arc reflectors 3, the prism panels 4 and the light diffusing panels 5 do not need to be provided so as to match the number of the light sources 1. They may be provided as one component regardless of the number of the light sources. Furthermore, the reflective light collector 2 and the arc reflector 3 may be integrally formed.

Reference Example 2

Next, an illumination apparatus 11 for micro photography which is Reference example 2 of the present invention will be described with reference to FIG. 13. This reference example is different from Reference example 2 in that assist light emitters for focusing, which were mentioned in Reference example 1, are arranged at places (two places) on a circle line along which light exit portions (14) where illumination light exits extend and in that the overall illumination optical systems and the illumination apparatus 111 are downsized. Specifically, a configuration of the light exit portions (14) is changed so as to have two arc shapes which sandwich arrangement areas of the assist light emitters 21 and 22 from that having a complete ring shape as described in Reference example 1.

Figure 13:
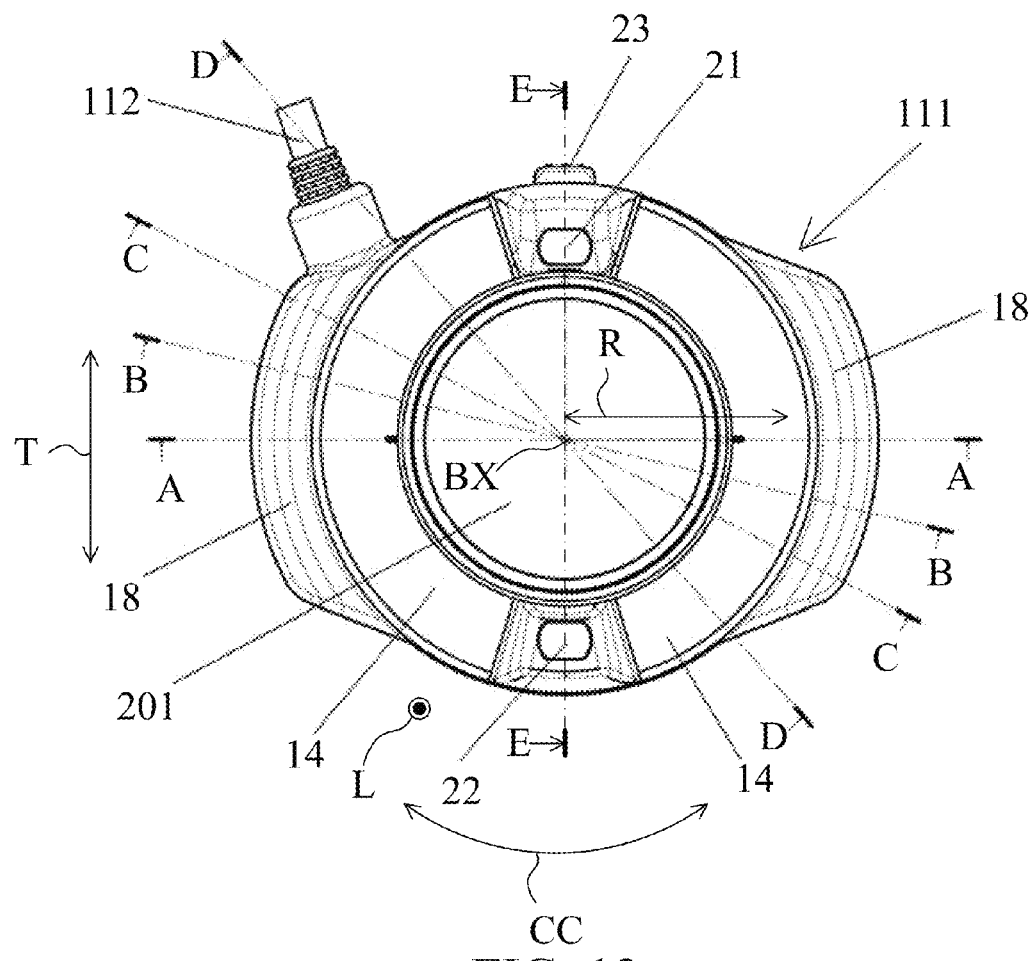
FIG. 13 is a front view of an illumination apparatus which is Reference example 2 of the present invention.
Figure 14A:
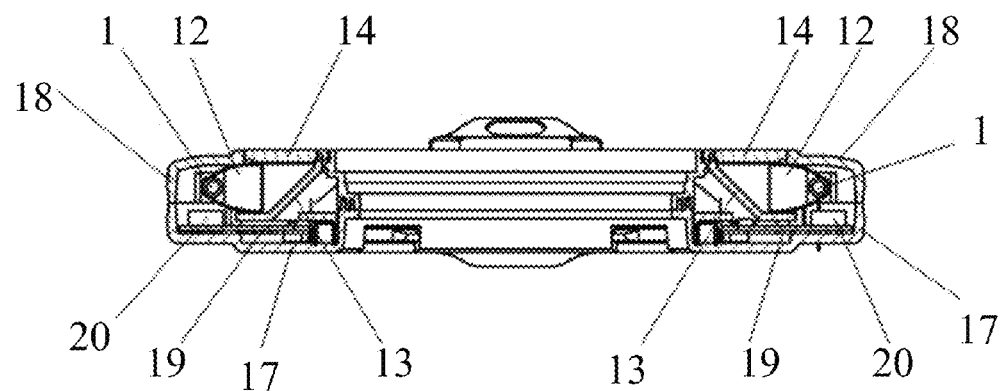
FIGS. 14A and 14B are a sectional view of the illumination apparatus of Reference example 2 and a partially enlarged view thereof.
Figure 14B:
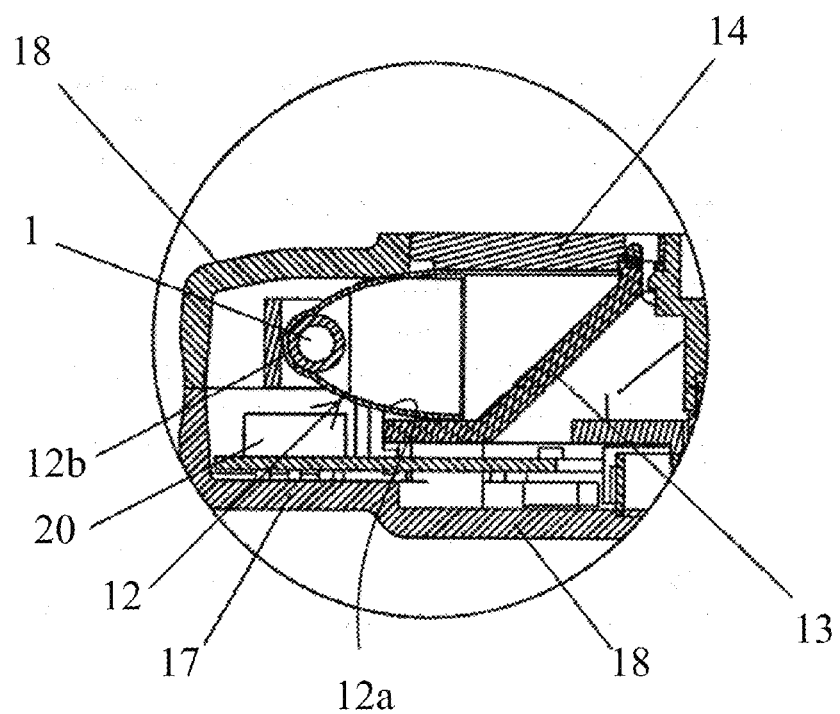
Figure 15A:
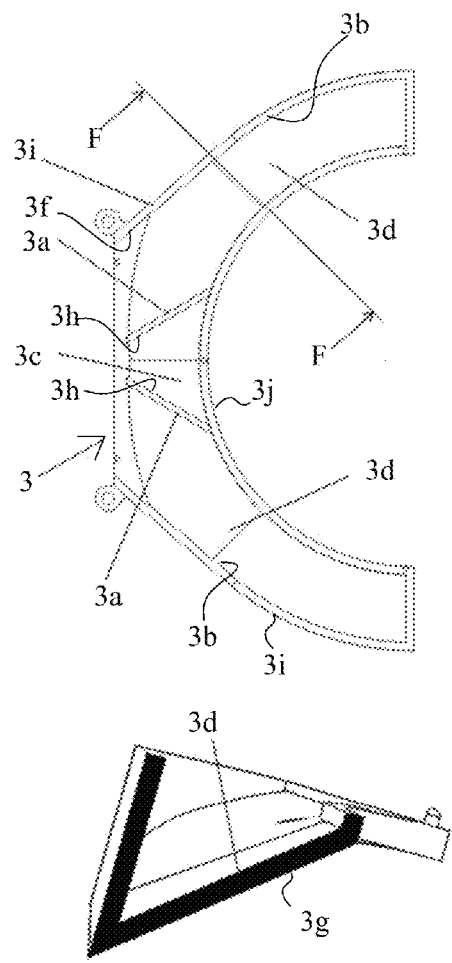
FIGS. 15A and 15B are comparison diagrams of Reference examples 1 and 2 (front views and sectional views of arc reflectors).
Figure 15B:
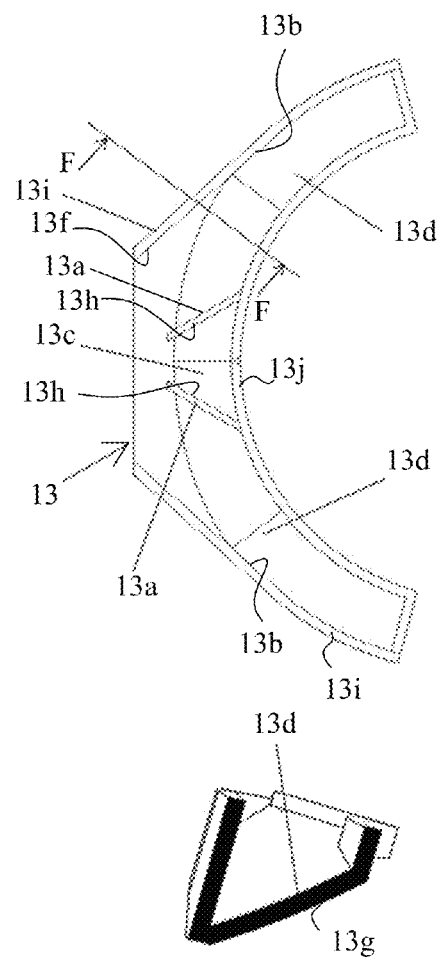
Figure 16A:
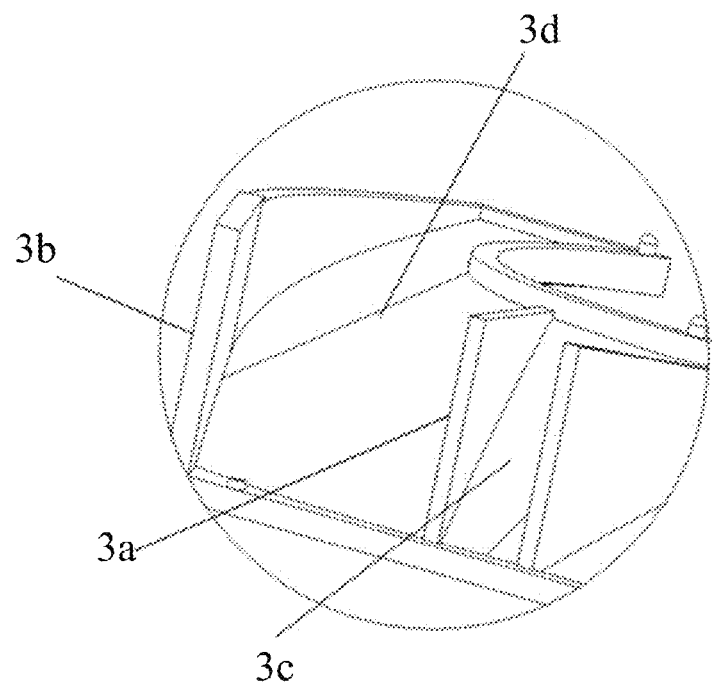
FIGS. 16A and 16B are comparison diagrams of Reference examples 1 and 2 (partially enlarged views of FIGS. 15A and 15B).
Figure 16B:
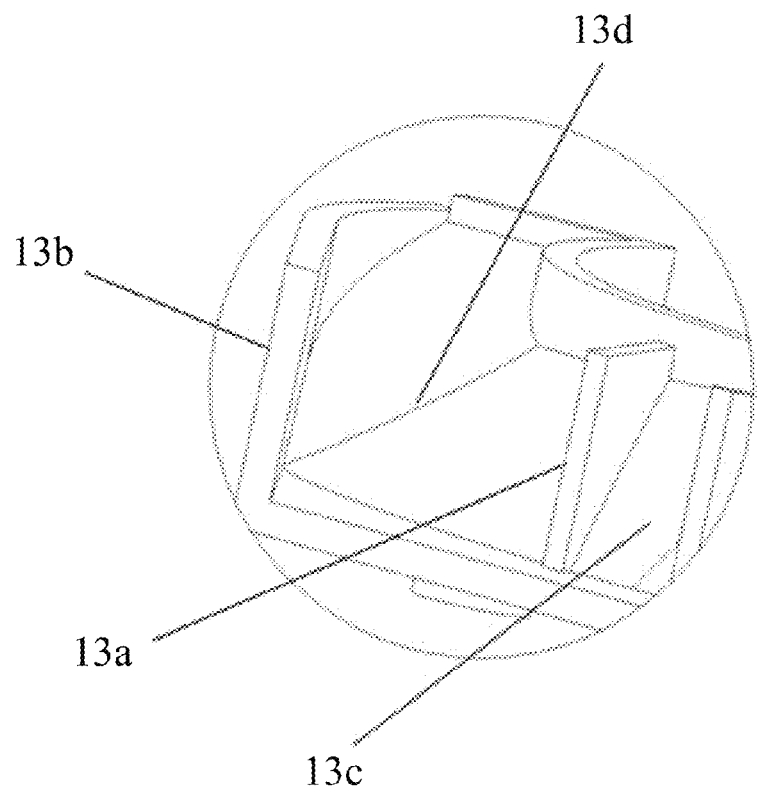
Figure 17A:
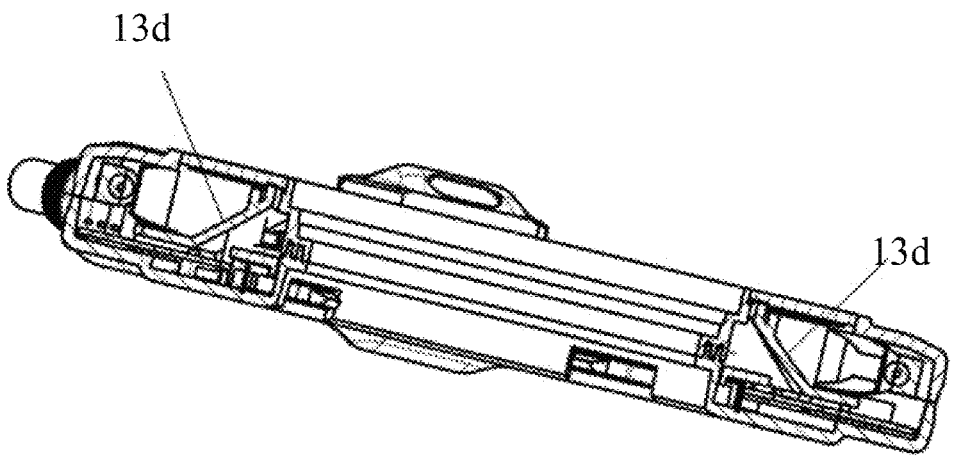
FIGS. 17A and 17B are comparison diagrams of Reference examples 1 and 2 (sectional views of the illumination apparatuses).
Figure 17B:
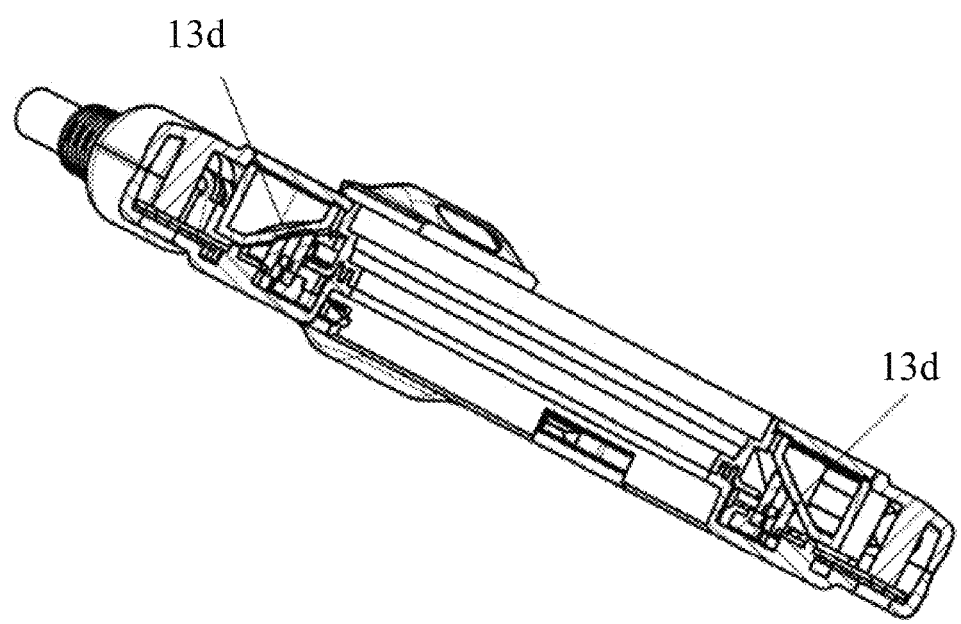
Figure 18A:
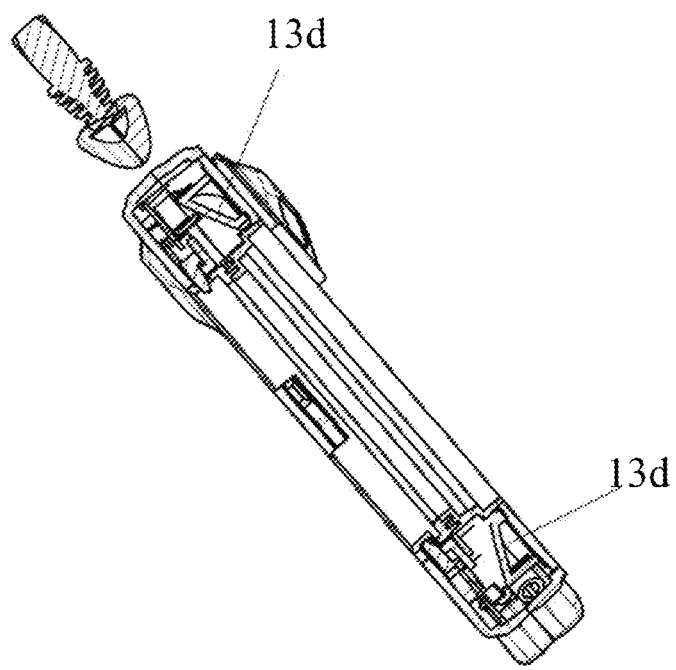
FIGS. 18A and 18B are sectional views showing an internal configuration of the illumination apparatus of Reference example 2.
Figure 18B:
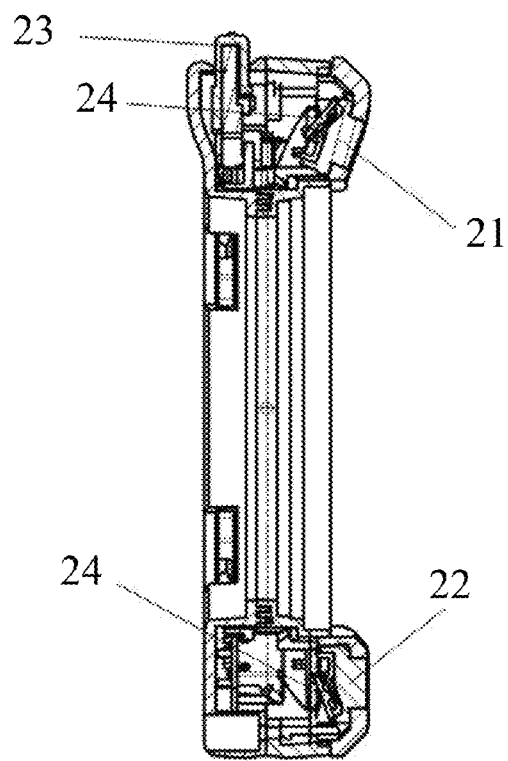
Figure 19:
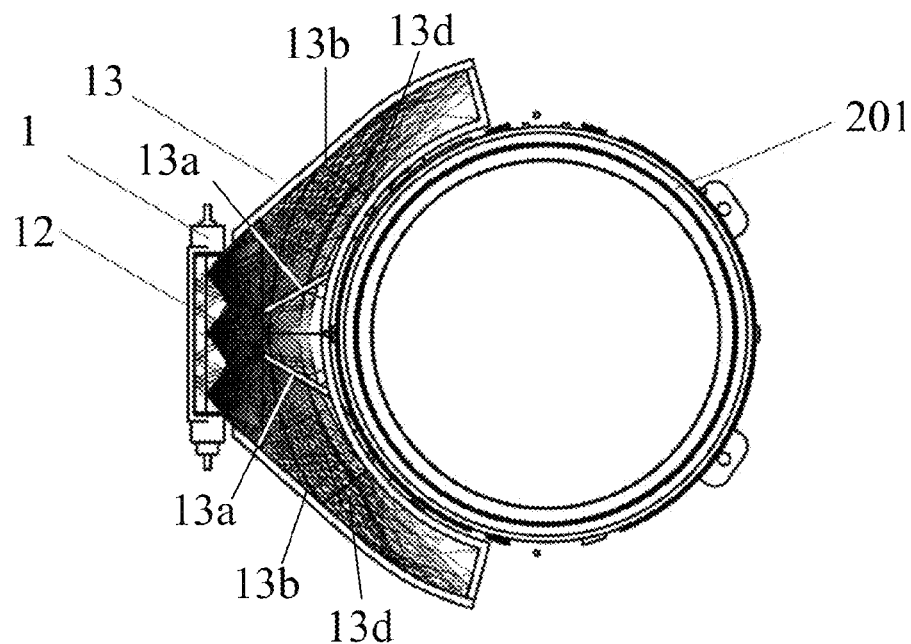
FIG. 19 is a ray tracing chart of the illumination apparatus of Reference example 2.

FIGS. 14A and 14B show sectional views of the illumination apparatus 111 of this reference example which are cut along an A-A line shown in FIG. 13. In an upper side of FIG. 15A, the arc reflector 3 in the illumination apparatus 101 described in Reference example 1, which is viewed from its front side, is shown, and therebelow, an enlarged sectional view of the arc reflector 3 when cut along an E-E line in the above figure is shown. On the other hand, in an upper side of FIG. 15B, an arc reflector 13 in the illumination apparatus 111 which will be described in this reference example, which is viewed from its front side, is shown, and therebelow an enlarged sectional view of the arc reflector 13 of this reference example when cut along an F-F line in the above figure is shown. Moreover, FIG. 16A shows an enlarged view of part of the arc reflector 3 in Reference example 1, and FIG. 16B shows an enlarged view of part of the arc reflector 13 in this reference example. Furthermore, FIGS. 17A and 17B and FIGS. 18A and 18B respectively show sectional views when the illumination apparatus 111 of this reference example is cut along B-B, C-C, D-D and E-E lines in FIG. 13. In addition, FIG. 19 is a ray tracing chart of the illumination apparatus of this reference example.

As shown in FIG. 13, the illumination apparatus 111 of this reference example is also detachably attached to the tip portion of the image capturing lens 201 so as to surround thereof. The illumination apparatus 111 includes a controller (not shown) which is connected by the connection cable 102 described in Reference example 1. Also in this reference example, as shown in FIG. 13, in a use state where the illumination apparatus 111 is attached to the image capturing lens 201, a direction toward an object field to be captured through the image capturing lens 201 is referred to as "a light projecting direction L" or "a front side" of the illumination apparatus 111. A direction corresponding to the radial direction of the image capturing lens 201 is referred to as "a radial direction R" of the illumination apparatus 111, and a direction surrounding the outer circumference of the image capturing lens 201 is referred to as "a circumferential direction CC" of the illumination apparatus 111. A direction in which a tangent line to the outer circumference (circle) of the image capturing lens 201 extends is referred to as "a tangent direction T" to the circumferential direction CC. A direction along the optical axis AX of the image capturing lens 201 is referred to as "a thickness direction" of the illumination apparatus 111.

Since a configuration of the illumination optical system of the illumination apparatus 111 of this reference example is basically the same as that of the illumination optical system of Reference example 1, a detail description of the illumination optical system is omitted. Constituent elements of this reference example identical to those of Reference example 1 are denoted by reference numerals same as those in Reference example 1, and their description is omitted. The illumination apparatus 111 of this reference example also has a symmetric configuration with respect to a center plane (plane of symmetry) which includes a center axis (axis coinciding with the lens optical axis AX in the use state) BX of the illumination apparatus 111 and on both sides of which two light sources are arranged. Therefore, in the following, a configuration of one side (left side) of the symmetric configuration will be described mainly and the other side (right side) of the symmetric configuration will be described as needed.

Reference numeral 12 denotes a reflective light collector as a light collector. The reflective light collector 12 includes a reflective surface 12a which reflects, of light diverging from an entire outer circumference of a straight tubular light source 1, light proceeding to directions other than directions toward an arc reflector 13 and a prism panel 14 each described later.

In this reference example, the light source 1 and the reflective light collector 12 are arranged on each of both sides sandwiching the center axis BX.

Parts of reflective surface 12a of the reflective light collector 12 are provided on both sides of the light source 1 in the thickness direction and on both sides of the light source 1 in its longitudinal direction, reflect the light to proceed toward the arc reflector 13 and the prism panel 14 and cause the reflected light to exit from a light exit opening formed between edge portions of the reflective surface 12a. Furthermore, the reflective light collector 12 causes, of the light diverging from the light source 1, light directly proceeding toward the arc reflector 13 and the prism panel 14 to exit from the light exit opening without reflecting it.

The reflective light collector 12 of this reference example includes, in order to reduce its size, a portion 12b having a half cylindrical shape (hereinafter referred to as "a half cylindrical portion"), which is different from the reflective light collector 2 of Reference example 1; the half cylindrical portion 12b has a reflective surface along a half cylindrical surface of the outer circumference of the light source 1 on an opposite side to the light exit opening. Thereby, the light emitted from the light source 1 toward the half cylindrical portion 12b is reflected by the half cylindrical portion 12b to be returned to the light source 1 again, and thereafter the returning light proceeds toward the light exit opening. The reflective surface 12a on a light exit opening side further than the cylindrical portion 12b has, in a sectional plane orthogonal to the longitudinal direction of the light source 1 (that is, the tangent direction T), a quadratic curve shape such as an elliptical shape. In the case of having an elliptical shape, similarly to the Reference example 1, it is desirable to dispose one of two focal points thereof at a radial center of the light source 1 and dispose the other one of the focal points on a first reflective surface (described later) of the arc reflector 13, that is, on a first reflective surface side. The reflective light collector 12 can be manufactured by the same method described in Reference example 1.

Reference numeral 13 denotes the arc reflector. The arc reflector 13 is provided for, similarly to the arc reflector 3 of Reference example 1, each of the two light sources 1 (that is, two arc reflectors 13 are provided in total). As shown in FIG. 15B in detail, the arc reflector 13 includes first reflective surfaces 13c and 13d which are formed inside further than the light source 1 in the radial direction R so as to extend in the circumferential direction CC and which reflect the light from the light source 1 (including the light reflected by the reflective light collector 12) in the light projecting direction L. Of the first reflective surfaces 13c and 13d, the first reflective surface 13c is a light source side reflective surface (first area) which is a portion facing a longitudinal central portion of the light source 1. Moreover, of the first reflective surfaces 13c and 13d, the first reflective surface 13d includes two arc reflective surfaces (second areas) formed so as to extend in an arc shape toward both sides from the light source side reflective surface 13c in the circumferential direction CC, that is, so as to extend away from the light source 1 in the circumferential direction CC. An optical path area (space) is formed between the light source side and arc reflective surfaces 13c and 13d and the prism panel 14 disposed further forward in the light projecting direction L than the reflective surfaces 13c and 13d.

In this reference example, the assist light emitters 21 and 22 are arranged between the two arc reflective surfaces 13d of the arc reflector 13 respectively provided for the two light sources 1 (at two places sandwiching the center axis BX). Therefore, a length of the arc reflective surface 13d in the circumferential direction CC is shorter than that of the arc reflector 3 in Reference example 1. Moreover, a width of the arc reflective surface 13*d* (that is, a width of the light exit portion) in the radial direction is also narrower than that of the arc reflector 3 in Reference example 1. This is not only to reduce its size but also to prevent, when the light exit portion is formed in an arc shape, unevenness in light amount between on an outer circumferential side and on an inner circumferential side which is likely to occur due to concentration of light on the outer circumferential side which causes reduction of light proceeding to the inner circumferential side.

The arc reflector 13 in this reference example also includes two second reflective surfaces 13*a*, similarly to the arc reflector 3 in the reference example 1. As shown in FIG. 19, the second reflective surfaces 13*a* reflect part of the light that proceeds toward the light source side reflective surface 13*c* from the light source 1, toward the optical path area extending in a direction away from the light source 1 in the circumferential direction CC along each of the arc reflective surfaces 13*d*. The role and arrangement of the two second reflective surfaces 13*a* are the same as those described in Reference example 1.

In this reference example, since the reflective light collector 12 is smaller in size than the reflective light collector 2 in Reference example 1, the two focal points of the reflective surfaces 12*a* are closer to each other as compared with those in Reference example 1. Therefore, the entire optical path length can be shortened as compared with that in Reference example 1. Furthermore, as compared in FIGS. 15A and 15B, in this reference example, a width of the arc reflector 13 in the radial direction R can be made narrower than that of the arc reflector 3 in Reference example 1 with the reduction in size of the reflective light collector 12. Therefore, in this reference example, volume of the illumination optical system can be smaller in size than that in Reference example 1. As a result, the entire illumination apparatus 111 can be downsized.

Reference numeral 14 denotes the prism panel (first optical member). The prism panel 14 is disposed at the light exit portion formed further forward in the light projecting direction L than the arc reflector 13. The prism panel 14 is manufactured to have a half arc shape with an opalescent optical material having a light diffusion property to diffuse light. In the illumination apparatus 111, two prism panels 14 are used.

Also in this reference example, as in Reference example 1, the light emitted from the light source 1 is divided into four types of light rays proceeding in mutually different optical paths in a sectional plane orthogonal to the longitudinal direction of the light source 1. Moreover, in an entrance surface of the prism panel 14 in this reference example, a prism array constituted of multiple minute prism portions are also formed as in Reference example 1. The functions of the prism portions for the four types of light rays are the same as those described in Reference example 1.

In this reference example, since light transmitted through the prism panel 14 is diffused toward the radial direction R by the light diffusion property of the prism panel 14, there is no need to use the light diffusing panel 5 used in Reference example 1. Thereby, downsizing (reduction of thickness) of the illumination apparatus 111 can be downsized in its thickness direction (that is, can be made thinner).

Reference numeral 17 denotes a back cover which holds the above described components constituting the illumination optical system and a mount substrate described later. Reference numeral 18 denotes a front cover which covers the light source 1 and the reflective light collector 12 in the front side of the illumination apparatus 111 and which includes a circle shaped opening exposing the light exit portion where the two prism panels 14 are disposed. In an inner circumferential portion around the opening of the front cover 18, engagement portions to hold the prism panels are formed. The reflective light collector(s) 12 and the light source(s) 1 thereinside are covered with the front cover 18, so that they cannot be seen through the prism panels 14 from the front side of the illumination apparatus 111.

On the mount substrate 19, electronic components 20 such as a trigger coil to start light emission of the light source 1, a light-receiving sensor to monitor a light amount emitted from the light source 1 and others are mounted.

Each of the assist light emitters 21 and 22 includes an LED 24 which is a light source and a light collecting lens which is arranged in front of the LED 24. The light emitted from the LED 24 is collected by the light collecting lens and is projected toward an object. Reference numeral 23 denotes a lock release button which is operated for releasing a locked state of a lock mechanism provided in the illumination apparatus 111 for attachment of the illumination apparatus 11 to the image capturing lens.

Next, the shape and others of the arc reflector 13 will be described in detail with reference to FIGS. 15B and 16A. The arc reflector 13 includes an entrance opening 13*f* into which an outer surface of the reflective light collector 12 near the light exit opening is fit and an arc shaped bottom portion 13*g* on which the light source side and arc reflective surfaces 13*c* and 13*d* as the first reflective surfaces are formed by metal deposition. Similarly to Reference example 1, the light source side reflective surface 13*c* is formed as part of a conical surface having a tilt angle of 45° with respect to a reference plane along the radial direction R in the above-mentioned central sectional plane passing through the longitudinal center of the light source 1.

Moreover, similarly to Reference example 1, each of the arc reflective surfaces 13*d* is formed, basically, as a surface tilted with respect to the reference plane along the radial direction R so as to be located further forward in the light projecting direction L (that is, so as to increase its height in the light projecting direction L) as being located away from the light source 1 (and the reflective light collector 12) in the circumferential direction CC. Furthermore, also in this reference example, similarly to Reference example 1, as shown in FIGS. 14A, 17A, 17B and 18A which are sectional views respectively corresponding to A-A, B-B, C-C and D-D lines in FIG. 13, the arc reflective surface 13*d* is formed as a twisted spiral surface.

However, in this reference example, as shown in the lower part of FIG. 15B and in FIG. 16B, the arc reflective surface 13*d* is formed as a curved surface in which its central part in the radial direction R (width direction) is concave toward the light exit portion (in the light projecting direction L) with respect to its both side parts. The lower part of FIG. 15A and FIG. 16A show the arc reflective surface 3*d* in Reference example 1 for comparison; the arc reflective surface 3*d* is formed as a flat surface.

The reason for forming the arc reflective surface 13*d* in such a concave curved surface is as follows. In this reference example, with the downsizing of the illumination optical system, the light source 1 is disposed closer to inner circumferential wall portions 13*j* of the arc reflector 13 than to the arc reflector 3 in Reference example 1, which makes it difficult for the light from the light source 1 to reach a far area of the light exit portion which is far away from the light source 1 in the circumference direction CC. Therefore, the arc reflective surface 13*d* is formed as the curved surface concave in its width direction so as to enlarge a space through which the light passes and thereby make it easy for the light from the light source 1 to reach the far area of the light exit portion. This configuration makes it possible to provide a uniform light amount distribution in the entire light exit portion.

The arc reflective surface 13d does not need to be formed as the curve surface whose central part in the width direction is most concaved, that is, the most concaved part may shift to one side in the width direction. Moreover, a shape of the arc reflective surface 13d in its width direction may change along the circumference direction CC.

The arc reflector 13 further includes two partition walls 13h on which the two second reflective surfaces 3a, which are disposed between the light source side reflective surface 13c and the two arc reflective surfaces 13d, are formed by metal deposition.

The arc reflector 13 further includes outer circumferential wall portions 13i which respectively extend along outer circumferences of the two arc reflective surfaces 13d and whose inner circumferential surfaces are formed as outer circumferential reflective surfaces 13b by metal deposition. As can be seen in FIG. 19, part of the light that is reflected by the second reflective surfaces 13a proceeds to the optical path area along the arc reflective surfaces 13d after being reflected by the outer circumferential reflective surfaces 13b. In addition, there is also light reaching the outer circumferential reflective surfaces 13b directly from the light source 1 or the reflective light collector 12 to be reflected thereby. The outer circumferential reflective surfaces 13b can cause such light to reach areas of the prism panel 14 further away in the circumferential direction CC from the light source 1.

The inner circumferential wall portion 13j extends along inner circumferences of the light source side reflective surface 13c and the two arc reflective surfaces 13d. Also on an inner surface of the inner circumferential wall portion 13j, a reflective surface is formed by metal deposition. In this reference example, in the radial direction R, a width of the prism panel 14 is larger than that of the light exit portion which is an arc shaped opening formed between the inner circumferential wall portion 13j and the outer circumferential wall portion 13i. However, the width of the light exit portion in the radial direction R and that of the prism panel 14 may correspond to each other.

Also in this reference example, part of the outer circumferential wall portion 13i near the light exit opening of the reflective light collector 12, that is, part thereof from the light source 1 to the arc reflective surface 13d extends in the tangent direction of the arc shaped outer circumference of the prism panel 14. Thereby, the light from the light source 1 can be used efficiently without being blocked.

As described above, in this reference example, as well as in Reference example 1, the reflection of the light from the light source 1 by the first reflective surfaces 13c and 13d of the arc reflector 13 enables forming the light exit portion extending to the circumferential direction, without using a curved-tubular light source. Furthermore, guiding part of the light from the light source 1 to the circumferential direction CC by the second reflective surfaces 13a of the arc reflector 13 enables the light from the light source 1 to uniformly exit from the light exit portion. Thereby, an illumination apparatus can be achieved which is capable of efficiently utilizing the light from the light source 1 and performing uniform illumination suitable for micro photography.

In the illumination apparatus 111 of this reference example, the reflective light collector 12 has the half cylindrical portion 12b formed along the outer circumferential surface of the light source 1 and a short focal length of the elliptic shape, which achieves further downsizing of the reflective light collector 12 in the radial direction R as compared with the illumination apparatus of Reference example 1. Moreover, the arc reflector 13 has a narrower width in the radial direction R to reduce a distance between the center axis BX and the light source 1 (that is, to shift the light source 1 closer to the lens optical) as compared with Reference example 1, which also achieves downsizing of the illumination apparatus 111 in the radial direction R.

Furthermore, in this reference example, efficient arrangement of the light exit portion where illumination light from the light source 1 exits and the assist light emitters 21 and 22 on the same circle line achieves downsizing of the illumination optical system and the illumination apparatus 111. With such downsizing of the illumination optical system, a new space can be formed at the back of the illumination optical system in the illumination apparatus 111. In this reference example, the mount substrate 19 on which the electronic components 20 are mounted is arranged in this back space. That is, arranging the mount substrate 19, which is similar to the mount substrate 9 which is arranged above (outside in the radial direction R further than) the light exit portion in the Reference example 1, in the back space eliminate a large protrusion above the light exit portion which exists in Reference Example 1 to achieve the downsizing of the illumination apparatus 111.

Embodiment 1

Description will hereinafter be made of Embodiment 1 of the present invention as a modified example of Reference example 2 with reference to FIGS. 20 to 27. In the following description, the light projecting direction L, the radial direction R, the circumferential direction CC, the tangent direction T and the center axis BX shown in Reference example 2 are not shown in the figures; however, they are used in the same meanings with the same reference characters. Moreover, the thickness direction is also used in the same meaning.

The illumination apparatus 131 of this embodiment also has a symmetric configuration with respect to a center plane (plane of symmetry) which includes the center axis BX and on both sides of which two light sources are arranged. Therefore, in the following, a configuration of one side of the symmetric configuration will be described mainly and the other side of the symmetric configuration will be described as needed.

Figure 20:
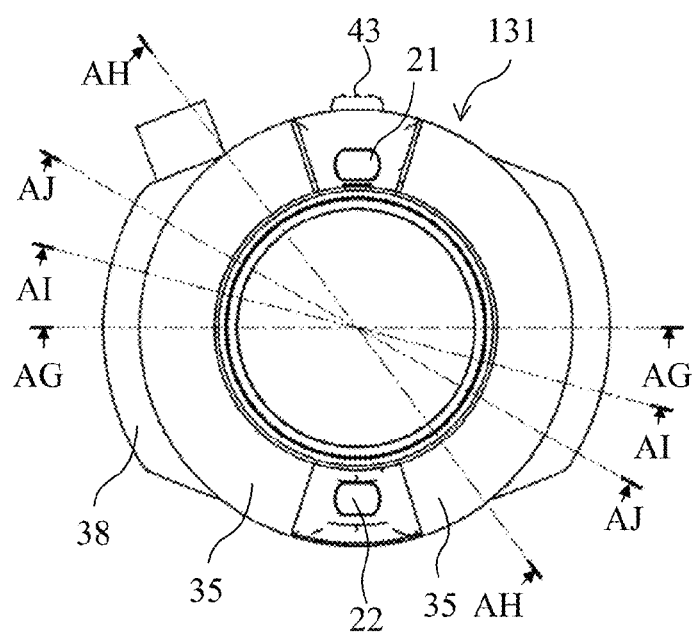
FIG. 20 is a schematic view showing an illumination apparatus which is Embodiment 1 of the present invention and an image pickup apparatus to which the illumination apparatus is attached.
Figure 21:
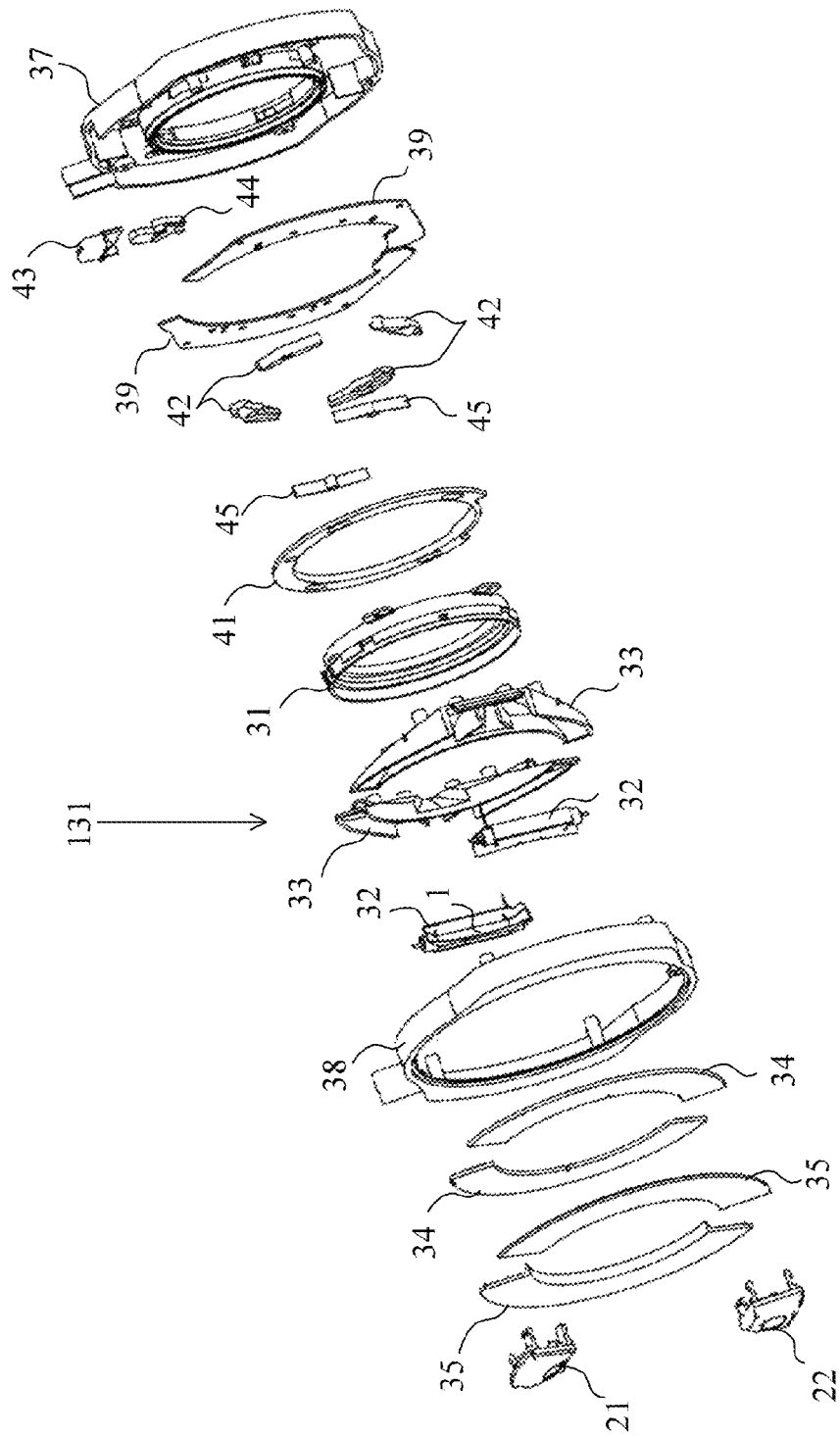
FIG. 21 is an exploded perspective view of the illumination apparatus of Embodiment 1.
Figure 22:
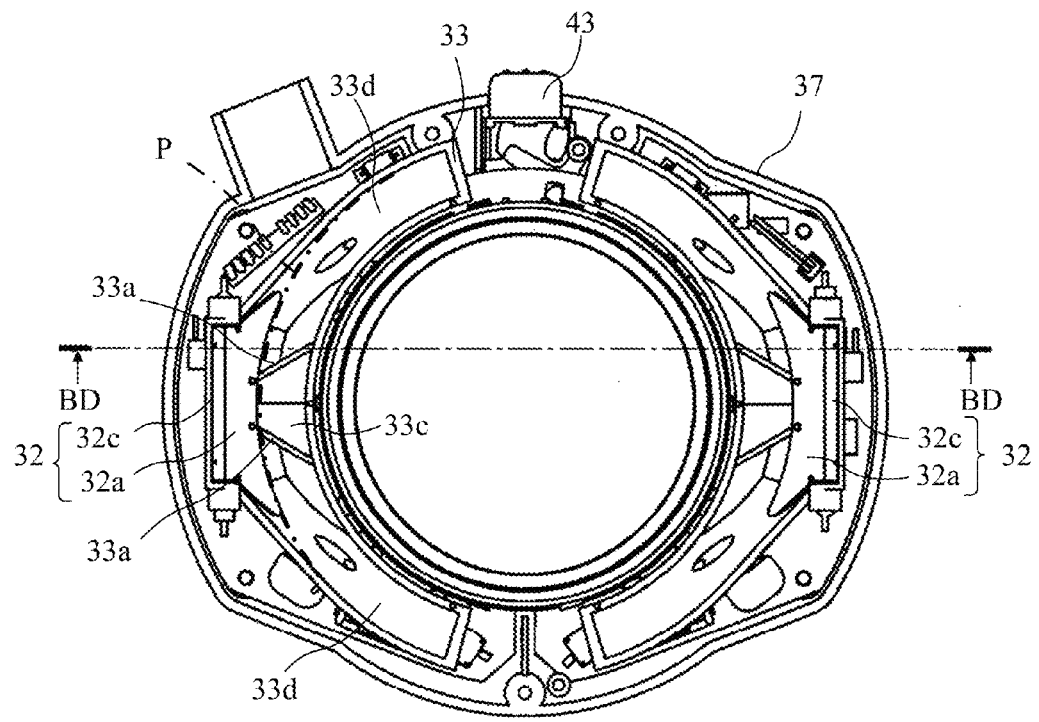
FIG. 22 is a front view showing an internal configuration of the illumination apparatus of Embodiment 1.
Figure 23:
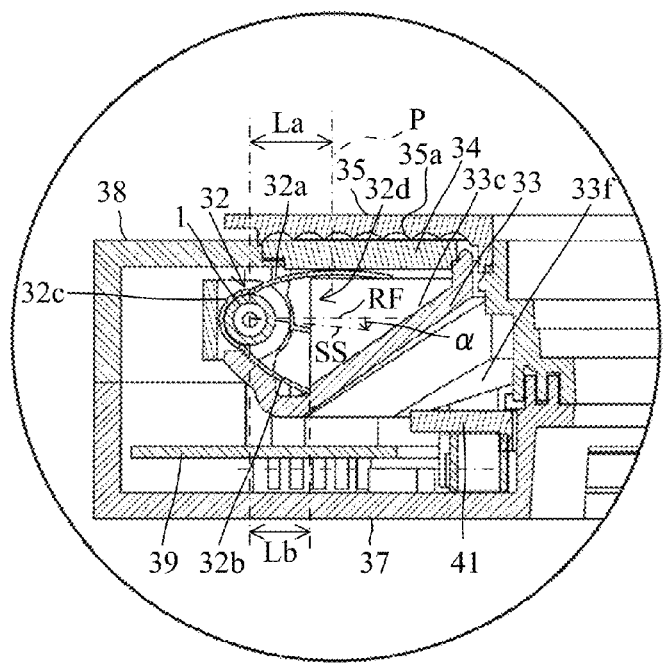
FIG. 23 is a partially enlarged sectional view of the illumination apparatus of Embodiment 1.

FIG. 20 shows the illumination apparatus 131 of this embodiment when viewed from its front side, and FIG. 21 is an exploded view of the illumination apparatus 131. FIG. 22 shows an internal configuration of the illumination apparatus 131 of this embodiment when viewed from the front side, and FIG. 23 is an enlarged sectional view of part (circled part in FIG. 25A) of the illumination apparatus 131.

Figure 24:
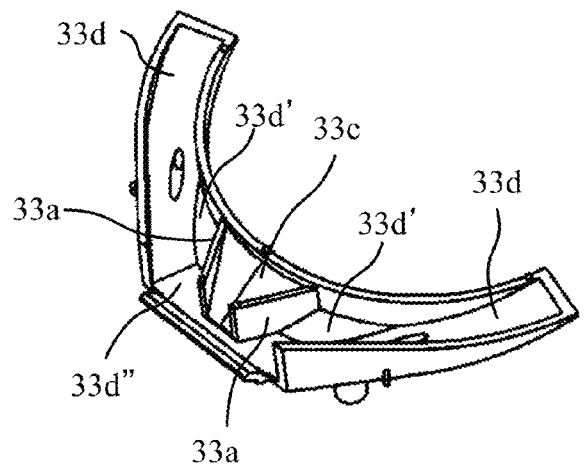
FIG. 24 is a schematic view of an arc reflector used in the illumination apparatus of Embodiment 1.
Figure 25A:
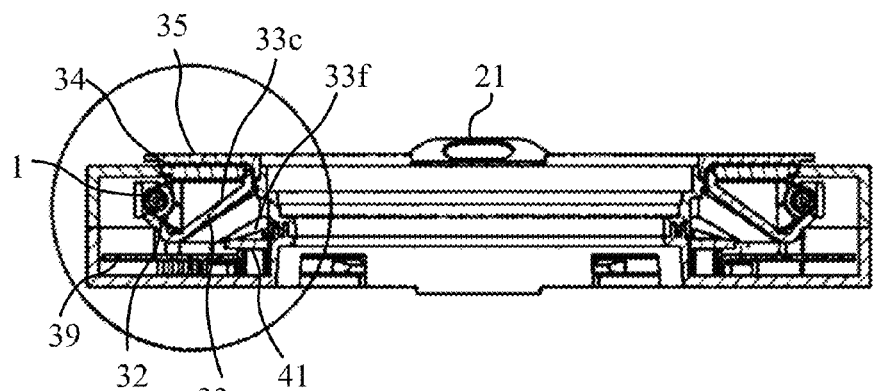
FIGS. 25A and 25B are sectional views of the illumination apparatus of Embodiment 1.
Figure 25B:
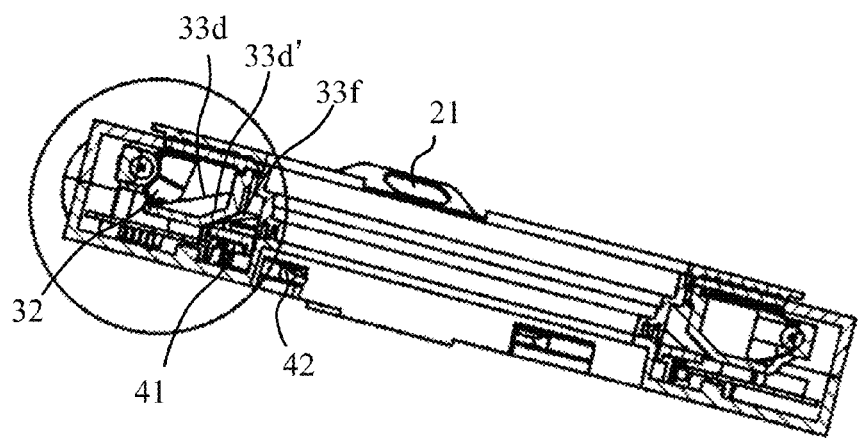
Figure 26A:
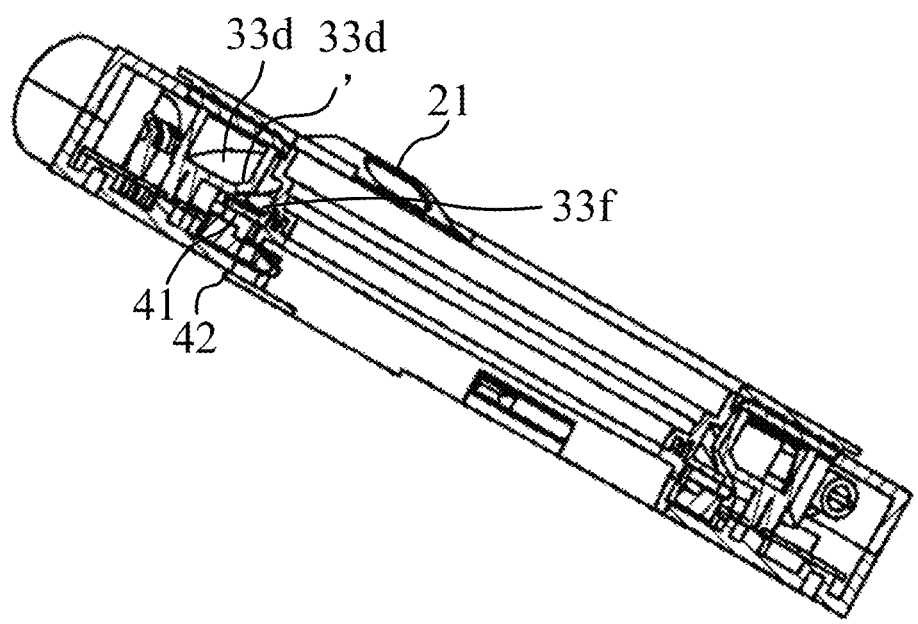
FIGS. 26A and 26B are other sectional views of the illumination apparatus of Embodiment 1.
Figure 26B:
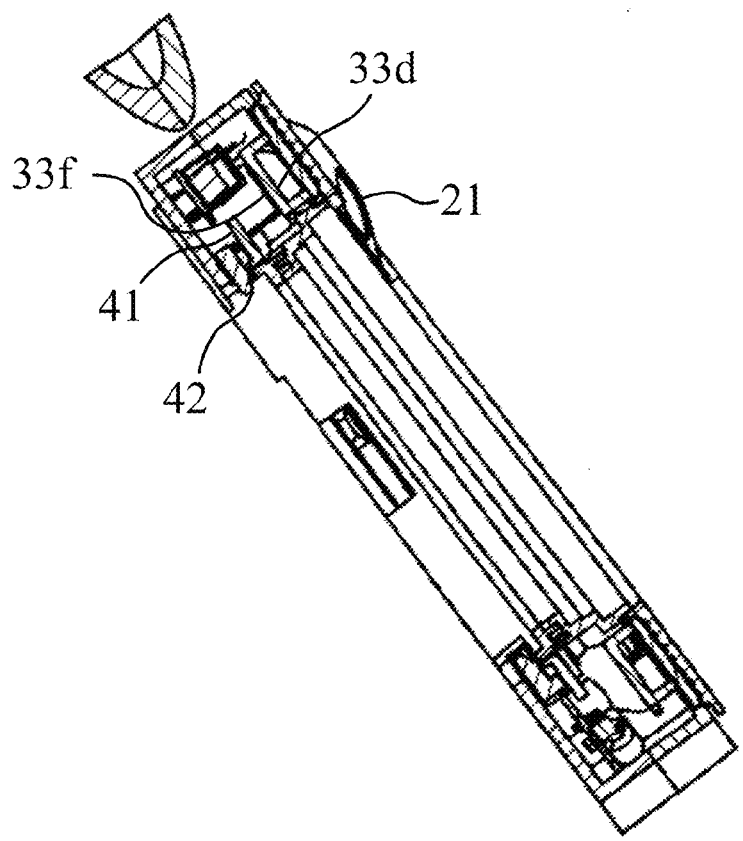
Figure 27:
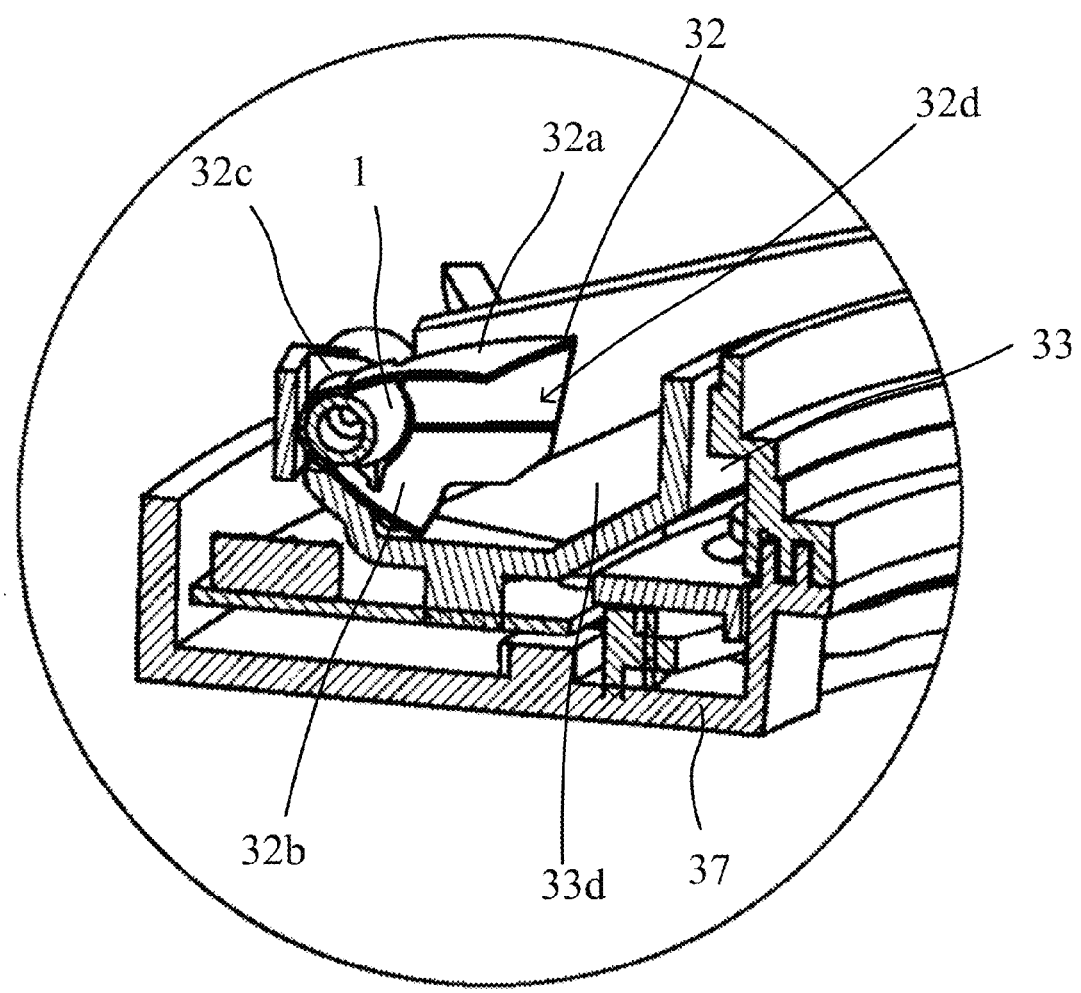
FIG. 27 is a partial sectional perspective view of the illumination apparatus of Embodiment 1.

FIG. 24 shows the arc reflector 33 in this embodiment when viewed from its diagonally front side. FIGS. 25A and 25B are sectional views of the illumination apparatus 131 of this embodiment respectively cut along AG-AG and AI-AI lines shown in FIG. 20. FIGS. 26A and 26B are sectional views of the illumination apparatus 131 of this embodiment respectively cut along AJ-AJ and AH-AH lines shown in FIG. 20. FIG. 27 shows a sectional view of part of the illumination apparatus 131 of this embodiment cut along a BD-BD line shown in FIG. 22 when viewed diagonally.

In these figures, reference numeral 1 denotes a light source, reference numeral 32 denotes a reflective light collector as a light collector, and reference numeral 33 denotes an arc reflector as a reflector. Reference numeral 34 denotes a prism panel as a first optical member, and reference numeral 35 denotes a light diffusing panel as a second optical member. Reference numeral 37 denotes a back cover, and reference numeral 38 denotes a front cover. These constituent elements basically have same functions as those having the same names shown in Reference example (or Reference example 1). However, since their shapes and arrangements are difference from those in Reference example 2 (or Reference example 1), these will be described below. Reference numerals 21 and 22 denote assist light emitters described in Reference example 2, and their description will be omitted.

The reflective light collector 32 includes a reflective surface which reflects, of light diverging from the entire outer circumference of the light source 1, light proceeding toward directions other than directions toward the arc reflector 33 and the prism panel 34. Parts of the reflective surface are provided on both sides of the light source 1 in the thickness direction and on both sides of the light source 1 in its longitudinal direction. Among the parts of the reflective surface, the reflective surfaces 32a and 32b are respectively the two surfaces provided on a light projecting direction (L) side further than the light source 1 in the thickness direction and on an opposite side thereto further than the light source 1, as shown in FIG. 23. Between edge portions of the reflective surfaces 32a and 32b (and the reflective surfaces on both sides of the light source 1 in the longitudinal direction), a light exit opening 32d is formed from which light emitted from the light source 1 and then reflected by each of the reflective surfaces and light proceeding without being reflected exit in the directions toward the arc reflector 33 and the prism panel 34.

Similarly to the reflective light collector of Reference example 2, in order to downsize the reflective light corrector 32 of this embodiment, the reflective light corrector 32 includes a half cylindrical portion 32c having a reflective surface along a half cylindrical surface in the outer circumference surface of the light source 1 on the opposite side to the light exit opening 32d. The reflective light collector 32 (reflective surfaces 32a and 32b) is disposed so that, in a sectional plane along the thickness direction shown in FIG. 23, a direction (SS in FIG. 23) of a center of an exit range (hereinafter referred to as "a light exit range") of the light exiting through the light exiting opening 32d tilts to the opposite side to the light projecting direction side inward in the radial direction R. Reference character RF in FIG. 23 denotes a reference plane along the radial direction R. The center direction (SS) of the light exit range has a tilt angle α with respect to the reference plane RF.

Moreover, the reflective surfaces 32a and 32b of the reflective light collector 32 have shapes along two surfaces (imaginary surfaces) symmetric to each other with respect to a plane of symmetry (hereinafter referred to "a symmetry plane") which passes the light source 1. That is, although actual shapes of the reflective surfaces 32a and 32b are different from each other as described later, shapes of base surfaces thereof are symmetric to each other with respect to the symmetry plane SS. The imaginary surface in this embodiment is a quadratic curved surface such as an elliptical surface. The reflective light collector 32 is disposed so that the symmetry plane SS tilts to the opposite side (backward) in the light projecting direction side inward in the radial direction R. That is, the symmetry plane SS has the tilt angle α with respect to the reference plane RF. The configuration in which the symmetry plane SS has the tile angle α with respect to the reference plane RF means a configuration in which the reflective surface 32b has, with respect to a plane passing through the light source 1 along the radial direction R, a larger opening angle toward a direction orthogonal to the plane along the radial direction R than that of the reflective surface 32a. In a case where the imaginary surface has an elliptical shape, it is desirable that one of focal points of the elliptical shape be located at a radial center of the light source 1 and the other focal point be located on a light source side reflective surface 33c (described later) of the arc reflector 33.

Such arrangement of the reflective light collector 32 whose center direction of the light exit range and the symmetry plane SS tilt backward is hereinafter referred to as "backward tilt arrangement".

Figure 28A:
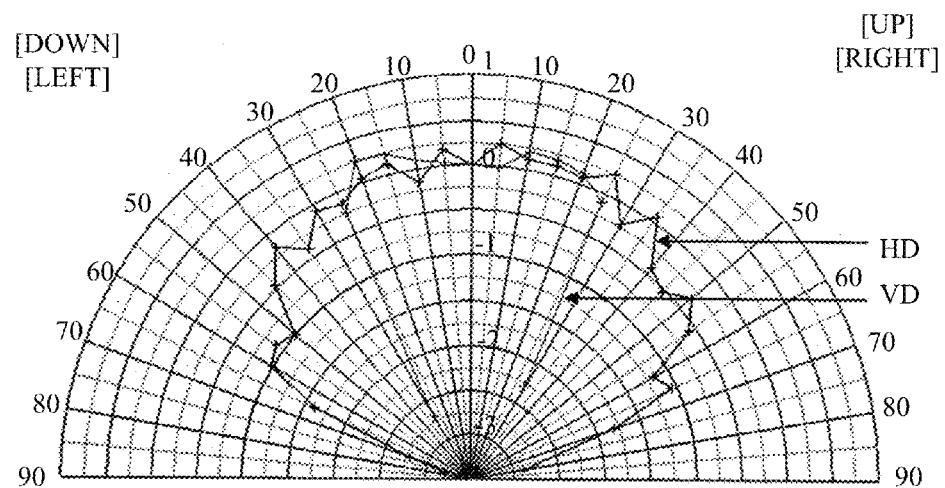
FIGS. 28A and 28B respectively show an exit range (light amount distribution) of light exiting from the reflective light collector in Reference example 2 and an exit range of light exiting from a reflective light collector in Embodiment 1.
Figure 28B:
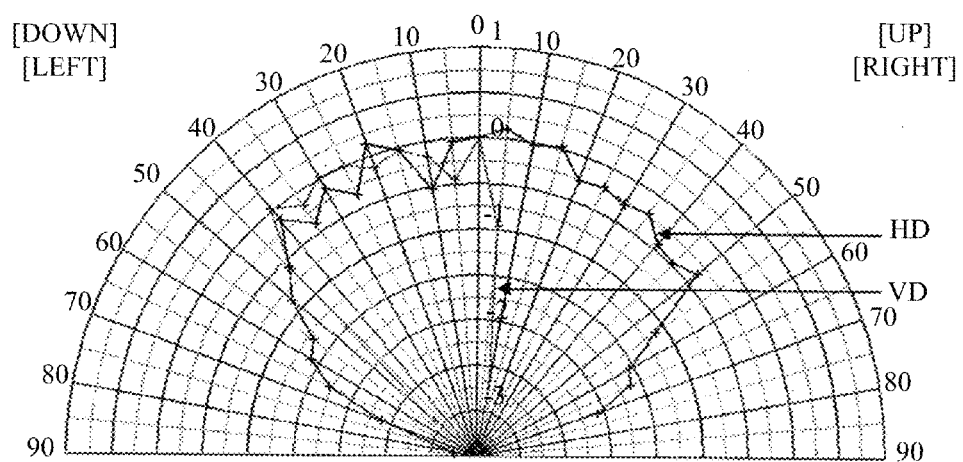

FIG. 28B shows an example (experimental example) of the light exit range of the light exiting from the light exit opening 32d of the reflective light collector 32 arranged in the backward tilt arrangement. In the figure, HD indicates a horizontal light exit range (light amount distribution) in the longitudinal direction of the light source 1 corresponding to a right and left direction. Moreover, VD indicates a vertical light exit range (light amount distribution) in the thickness direction corresponding to an up and down direction. In the thickness direction, 0 (deg) in the figure corresponds to the reference plane RF shown in FIG. 23, and the center direction (SS) of the vertical light exit range VD has a tilt angle of 20 (deg) backward (indicated as DOWN in the figure) with respect to 0 (deg). In the longitudinal direction of the light source 1, the center direction of the horizontal light exit range HD is 0 (deg).

FIG. 28A shows a comparison example (experimental example) of the light exit range in a case where the reflective light collector 32 is arranged so that the center direction (SS) of the vertical light exit range VD of the light exiting from the light exit opening becomes 0 (deg) corresponding to the direction along the reference plane RF in the sectional plane along the thickness direction as in Reference example 2. In this case, the symmetry plane SS does not tilt with respect to the reference plane RF. In the longitudinal direction of the light source 1, the center direction of the horizontal light exit range HD is also 0 (deg) as well as in the case of the backward tilt arrangement.

The arc reflector 33 includes, near radially inner edge portions of the reflective light collector 32, the above-mentioned light source side reflective surface 33c facing a longitudinal central portion of the light source 1 and two arc reflective surfaces 33d extending in an arc shape toward both sides from the light source side reflective surface 33c in the circumferential direction CC. Employing the backward tilt arrangement of the reflective light collector 32 makes it possible to arrange the light source 1, with the reflective light collector 32, closer to the light source side reflective surface 33c of the arc reflector as compared with the configuration of Reference example 2 shown in FIG. 14B. In other words, the backward tilt arrangement of the reflective light collector 32 enables downsizing of the illumination optical system and also the illumination apparatus 131 in the radial direction R. Furthermore, the backward tilt arrangement of the reflective light collector 32 makes it possible to form the light source side reflective surface 33c as a reflective surface having a tilt angle smaller than 45° with respect to the reference plane along the radial direction R. Therefore, the arc reflector 33 can be formed thinner as compared with the case where the light source side reflective surface is a reflective surface having a tilt angle of 45° as described in Reference example 2. Thereby, as will be described later, another constituent element having a certain amount of volume can be arranged at the back of the arc reflector 33.

However, such arrangement in which the reflective light collector 32 is close to the light source side reflective surface 33c of the arc reflector 33 causes the following problem. If the reflective surface 32b provided on the opposite side to the light projecting direction side extends long from the light source 1 similarly to Reference example 2, the arc reflector 33 needs to be moved backward in order to prevent interference between the reflective surface 32b and the light source side reflective surface 33c. As a result, a thickness of the illumination optical system increases, which increases the size of the illumination apparatus 131 in the thickness direction.

In order to prevent such increase in thickness, this embodiment reduces a length Lb of the reflective surface 32b from the light source 1 in the radial direction R as compared with a length La therefrom of the reflective surface 32a provided on the light projecting direction side. When, of the reflective surface 32b, a portion extending toward the arc reflective surfaces 33d does not interfere therewith, only the length Lb of a portion extending toward the light source side reflective surface 33c may be reduced as shown in FIG. 27. That is, in the reflective light collector 32, part of the reflective surface 32b may have a shorter length from the light source 1 in the radial direction R than that of another part of the reflective surface 32b. In FIG. 27, in order to form a short length part of the reflective surface 32b having a shorter length from the light source 1 than another part thereof, the reflective surface 32b has a receded part. Such a configuration in which the length Lb of the receded part is made to be shorter than the length La of the reflective surface 32a from the light source 1 as shown in FIG. 27 means that a length of at least part of the reflective surface 32b is made to be shorter than the length La of the reflective surface 32a from the light source 1. In this configuration, when viewed from the thickness direction, the radially inner edge portion of the reflective surface 32b has a concave shape.

On the other hand, if the length of the reflective surface 32a provided on the light projecting direction side from the light source 1 is also shortened similarly to that of the reflective surface 32b, the light collecting function of the reflective light collector 32 to collect the light diverging from the light source 1 cannot be sufficiently provided. Therefore, as shown in FIG. 22, the reflective surface 32a is formed so that its radially inner edge portion extends inward in the radial direction R as much as possible and has an arc shape along an outer circumference P of the light exit portion. The light exit portion described here is an arc shaped or ring shaped area which is formed on the light projecting direction side further than the arc reflector 33 and which causes the light to exit toward an object filed; a prism panel 34 and a light diffusing panel 35 each described later are arranged at the light exit portion. However, a width of the light exit portion in the radial direction R in this embodiment is narrower than those of the prism panel 34 and the light diffusing panel 35, similarly to that in Reference example 2. The width of the light exit portion in the radial direction R in this embodiment is approximately the same as that of part of the first reflective surface (arc reflective surface) 33d in the arc reflector 33 which is part away from a vicinity of the light source 1 in the circumferential direction CC.

The arc reflector 33 is provided for each of the two light sources 1 (that is, two arc reflectors 33 are provided in total). As shown in FIG. 24 in detail, the arc reflector 33 includes first reflective surfaces 33c and 33d which are formed inside further than the light source 1 in the radial direction R so as to extend in the circumferential direction CC and which reflect the light from the light source 1 (including the light reflected by the reflective light collector 32) in the light projecting direction L. Of the first reflective surfaces 33c and 33d, the first reflective surface 33c is the above-mentioned light source side reflective surface (first area) which is a portion facing a longitudinal central portion of the light source 1. Furthermore, of the first reflective surfaces 33c and 33d, the first reflective surface 33d includes two arc reflective surfaces (second areas) formed so as to extend in an arc shape toward both sides from the light source side reflective surface 33c in the circumferential direction CC, that is, so as to extend away from the light source 1 in the circumferential direction CC. An optical path area (space) is formed between the light source side and arc reflective surfaces 33c and 33d and the prism panel 34 disposed further forward in the light projecting direction L than the reflective surfaces 33c and 33d.

The light source side reflective surface 33c is formed as part of a conical surface having a tilt angle smaller than 45° with respect to the above-described reference plane along the radial direction R in a central sectional plane passing through a longitudinal center of the light source 1.

Each of the arc reflective surfaces 33d is formed, basically, as a surface tilted with respect to the reference plane along the radial direction R so as to be located further forward in the light projecting direction L (that is, so as to increase its height in the light projecting direction L) as being located away from the light source 1 (and the reflective light collector 32) in the circumferential direction CC. In this embodiment, as also shown in FIGS. 25A, 25B, 26A and 26B, the arc reflective surface 33d is formed as a spiral surface without twist (that is, a spiral surface along the radial direction R), which is different from Reference example 2. However, in the arc reflective surface 33d, a portion 33d' adjacent to the light source side reflective surface 33c with a second reflective surface 32a disposed therebetween is formed as part of a conical surface having a tilt angle smaller than 45° with respect to the reference plane, similarly to the light source side reflective surface 33c. This is to efficiently reflect the light from the light source 1 to the optical path area further away from the light source 1 than the conical surface portion 33d' of the arc reflective surface 33d in the circumferential direction CC and to form a space where a lock mechanism (described later) is disposed at the back of the conical surface portion 33d' of the arc reflector 33. The space where the lock mechanism is disposed will be described in detail later.

Furthermore, in the arc reflective surface 33d, an outer circumferential portion 33d" formed further outside than the conical surface portion 33d' is formed as a flat plane along the reference plane to enlarge a space facing the outer circumferential portion 33d" in order to provide the light to a far optical path portion away from the light source 1 in the optical path area extending in the circumferential direction CC. In addition, forming the outer circumferential portion 33d" as a flat plane makes it possible to prevent interference between the portion 33d" and the reflective surface 32b of the reflective light collector 32.

The arc reflector 33 includes, similarly to Reference example 2, two second reflective surfaces 33a formed with the light source side reflector surface 33c disposed therebetween. The second reflective surfaces 33a reflect part of the light that proceeds toward the light source side reflective surface 33c from the light source 1, toward the optical path area extending in a direction away from the light source 1 in the circumferential direction CC along each of the arc reflective surfaces 33d.

In addition, the arc reflector 33 includes, similarly to the arc reflector 13 in Reference example 2, outer circumferential wall portions and inner circumferential wall portions.

In FIG. 21, reference numeral 31 denotes a cylindrical cover which is to be attached at a front end of a central cylindrical portion (portion to be attached to an outer circumference of a tip portion of an image capturing lens) of the back cover 37. Two arc reflectors 33 are arranged so as to surround an outer circumference of the cylindrical cover 31. Reference numeral 39 denoted a mount substrate on which, similarly to Reference example 2, electronic components such as a trigger coil to start light emission of the light source 1, a light-receiving sensor to monitor a light amount emitted from the light source 1 and others are mounted.

Reference numerals 42 denote engagement hooks which are arranged at four circumferential places in the back cover 37 near the cylindrical portion thereof. Description will hereinafter be made of the lock mechanism including the engagement hooks 42 with further reference to FIG. 29. The lock mechanism is a mechanism to support (lock) the illumination apparatus 131 arranged surrounding the outer circumference of the tip portion of the image capturing lens 201 by the image capturing lens 201.

Figures 29A, 29B:
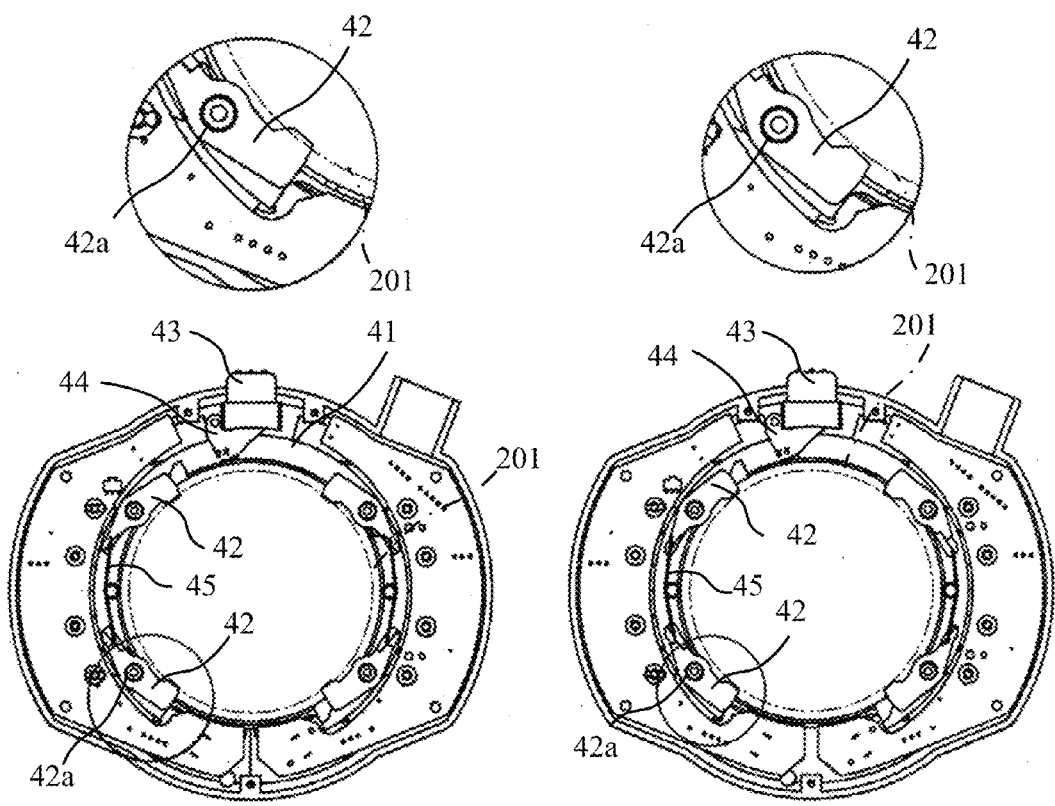
FIGS. 29A and 29B are front views showing a lock mechanism in the illumination apparatus of Embodiment 1.

Each engagement hook 42 attached to the back cover 37 so as to be rotatable about a rotation center 42a in a direction protruding inside the cylindrical portion of the back cover 37 (the direction is hereinafter referred to as "a locking direction") and in a direction retracting therefrom (the direction is hereinafter referred to as "a lock releasing direction"). FIG. 29A shows a locked state where the engagement hooks 42 are rotated in the locking direction to protrude inside the cylindrical portion of the back cover 37 and engaged with engagement groove portions (not shown) formed in the outer circumference of the image capturing lens 201. In the locked state, the engagement of the engagement hooks 42 with the engagement groove portions of the image capturing lens 201 fixes the illumination apparatus 131 to the image capturing lens 201. FIG. 29B shows a lock released state where the engagement hooks 42 are rotated in the lock releasing direction to retract from the inside of the cylindrical portion of the back cover 37 and disengaged from the engagement groove portions of the image capturing lens 201.

Reference numeral 45 denotes a lock spring as a biasing member to bias the engagement hooks 42 to the locking direction. In this embodiment, one lock spring 45 is provided per two engagement hooks 42. Each lock spring 45 is attached at its cylindrical portion to the back cover 37, and two arms of the lock spring 45 extending from the cylindrical portion respectively engage with the different engagement hooks 42 to push them in the locking direction.

Reference numeral 41 denotes a lock release ring which is arranged so as to be rotatable around an outer circumference of the cylindrical cover 31. Although not shown in the figure, the lock release ring includes a cam surface to rotate the engagement hooks 42 in the lock releasing direction. A cam follower (not shown) is formed in each engagement hook on an opposite side, with respect to the rotation center 42a, to its tip portion protruding to and retracting from the inside of the cylinder portion of the back cover 37 as described above.

Reference numeral 43 denotes a lock release button which is operated by a user so as to be pushed in the radial direction R when releasing the locked state of the engagement hooks 42. Reference numeral 44 denotes a connection member to convert the movement of the lock release button 43 in the radial direction R due to the push operation into rotation of the lock release ring 41. The connection member 44 is rotatably attached to the back cover 37; one end thereof is inserted in the lock release button 43 and another end thereof is rotatably connected with the lock release ring 41.

When the connection member 44 rotates with respect to the back cover 37 due to the push operation of the lock release button 43 in the locked state, the rotation of the connection member 44 is transmitted to the lock release ring 41 and thereby the lock release ring 41 is rotated with respect to the back cover 37. When the lock release ring 41 rotates, the cam surface pushes the cam follower of each engagement hook 42 inward in the radial direction R to rotate each engagement hook 42 in the lock releasing direction against a biasing force of the lock spring 45. Thereby, the illumination apparatus 131 can be detached from the image capturing lens 201.

Next, description will be made of a relation between the lock mechanism and the above-described arc reflector 33 with reference to FIGS. 23, 25A, 26A and 26B. As shown in these figures, on the back side of the conical surface portion 33d' of the arc reflective surface 33d of the arc reflector 33, a retracted portion 33f is formed in which its inner circumferential side part in the radial direction R is located on the light projecting direction (L) side further than its outer circumferential side part formed further outside than the inner circumferential side part. In other words, in order to form the retracted portion 33f, the conical surface portion 33d' is formed in the arc reflective surface 33d which is the spiral surface along the radial direction R. In the lock mechanism, the lock release ring 41, the lock springs 45 and the engagement hooks 42 are arranged in an area (space) facing the retracted portion 33f.

The reduction of thickness of the arc reflector 33 itself as described above and the provision of the retracted portion 33f on the back side of the arc reflector 33 makes it possible to arrange a large constituent element such as the lock mechanism on the back side of the arc reflector 33 without increasing the thickness of the illumination apparatus 131. Moreover, arranging the lock mechanism on the back side of the arc reflector 33 makes it possible to achieve downsizing of the illumination apparatus 131 in the radial direction R.

Figure 30A:
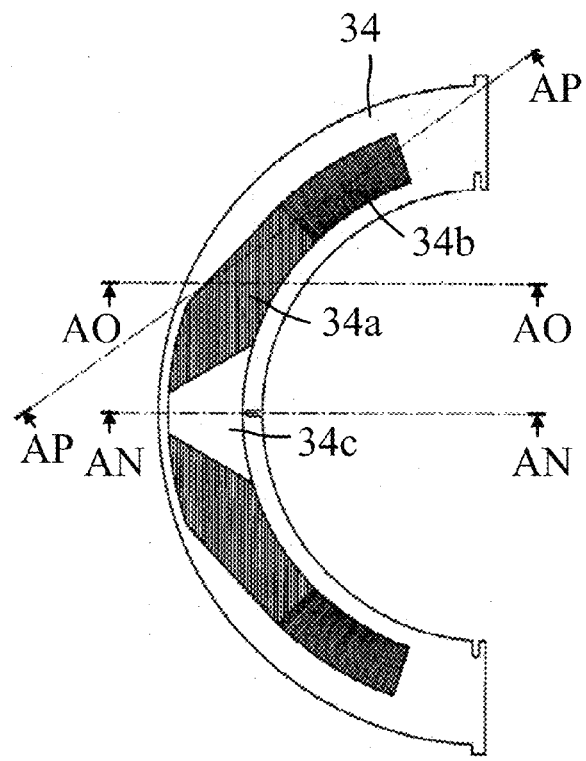
FIGS. 30A to 30D show a prism panel used in the illumination apparatus of Embodiment 1.

The prism panel 34 is arranged at the light exit portion formed further forward in the light projecting direction l than the arc reflector 33. The prism panel 34 is manufactured so as to have a half circle shape (arc shape) with a light transmissive plastic material having a high transmittance such as acrylic plastic; two prism panels 34 are assembled in a ring shape. As shown in FIG. 30A, prism arrays 34a and 34b each of which is constituted of multiple minute prism portions are formed on an entrance surface (light source side surface) of the prism panel 34, similarly to the prism panel 4 described in Reference example 1. Each prism portion has a function similar to that of the prism portion of the prism panel 4 in Reference example 1. That is, each prism portion transmits light of the light emitted from the light source 1 (or from the reflective light collector 32) which reaches without being reflected by the arc reflective surface 33d of the arc reflector 33 to the light projecting direction L and internally totally reflects at least light reaching without being reflected by the arc reflective surface 33d to the light projecting direction L.

Figure 30B:
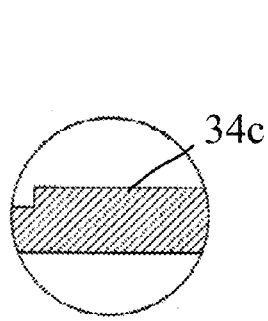
Figure 30C:
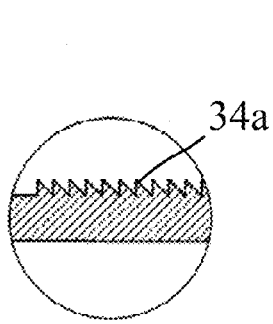
Figure 30D:
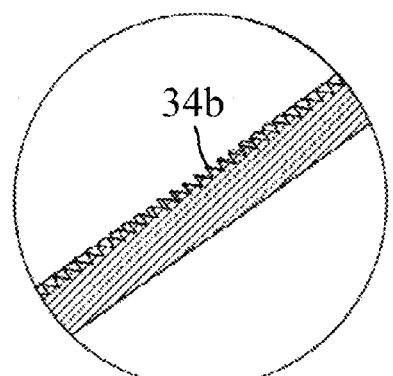

However, in this embodiment, a direction in which the prism portions constituting the prism array 34a extend is different from that in which the prism portions constituting the prism array 34b located further away from the light source 1 in the circumferential direction CC than the prism array 34a. A boundary between the prism arrays 34a and 34b is located at a position shifted by approximately 45° in the circumferential direction CC from a position corresponding to the longitudinal center of the light source 1. Each prism portion (first prism portion) constituting the prism array 34a is formed so as to extend along the longitudinal direction of the light source 1 as shown in FIG. 30C which is a sectional view along an AO-AO line in FIG. 30A. On the other hand, each prism portion (second prism portion) constituting the prism array 34b is formed so as to extend in the radial direction R as shown in FIG. 30D which is a sectional view along an AP-AP line in FIG. 30A. In the prism panel 34, such prism arrays 34a and 34b are provided on both sides of an area 34c of the prism panel 34 in the circumferential direction CC; the area 34c faces the light source side reflective surface 33c of the arc reflector 33. The area 34c facing the light source side reflective surface 33c, that is, an area closer to the longitudinal center of the light source 1 than the prism array 34a is not provided with such prism portions as shown in FIG. 30B which is a sectional view along an AN-AN line in FIG. 30A. The prism panel 34 has an exit surface formed as a flat plane.

In an area near the light source 1 where the prism array 34a is formed, light rays from the light source 1 do not yet proceed to parts of the arc shaped optical path area. Therefore, it is desirable that the prism portions constituting the prism array 34a be formed so as to extend in the longitudinal direction of the light source 1 so that incident angles of the light rays to the direction in which the prism portions extend is small. This setting makes it possible to prevent the light rays proceeding toward the prism portions from being reflected thereby. In other words, this setting makes it possible to effectively utilize a direction changing function due to the internal total reflection by the prism portions for the light rays from the light source 1.

On the other hand, in an area away from the light source 1 where the prism array 34b is formed, light rays from the light source 1 already enter the arc shape optical path area. Therefore, it is desirable that the prism portions constituting the prism array 34b are formed so as to extend in the radial direction R for the same reason as that of the prism array 34a.

In this embodiment, since the reflective light collector 32 is arranged in the backward tilt arrangement, almost all of the light rays entering the area 34c facing the light source side reflective surface 33c are light rays reflected by the light source side reflective surface 33c. Therefore, direction change by the prism portions is not necessary. Thus, there is no need to form prism portions in the area 34c.

The light diffusing panel 35 is, similarly to the light diffusing panel 35 described in Reference example 1, an optical member in which multiple cylindrical lenses 35a extending in the circumferential direction CC concentrically are formed. Due to a function of the cylindrical lenses 35a, the light diffusing panel 35 uniformly diffuses the light emitted from the prism panel 34 in a light projection range suitable for micro photography.

According to this embodiment, similarly to Reference examples 1 and 2, the reflection of the light from the light source 1 by the first reflective surfaces 33c and 33d of the arc reflector 33 enables forming the light exit portion extending to the circumferential direction CC, without using a curved-tubular light source. Furthermore, guiding part of the light from the light source 1 to the circumferential direction CC by the second reflective surfaces 33a of the arc reflector 33 enables the light from the light source 1 to uniformly exit from the light exit portion. Thereby, an illumination apparatus can be achieved which is capable of efficiently utilizing the light from the light source 1 and performing uniform illumination suitable for micro photography.

Moreover, the backward tilt arrangement of the reflective light collector 32 enables downsizing of the illumination optical system in the radial direction R and thickness reduction thereof. Furthermore, the thickness reduction of the illumination optical system enables forming a new space where the lock mechanism can be disposed thereinside on the back side of the illumination optical system. Therefore, the illumination apparatus can be further downsized in the radial direction as compared with the case where the lock mechanism and the illumination optical system are disposed by being shifted in the radial direction.

In this embodiment, as described in Reference example 1, the light exit portion of the illumination apparatus may be formed in a rectangular shape or a polygonal shape instead of the ring shape.

Embodiment 2

Figure 31A:
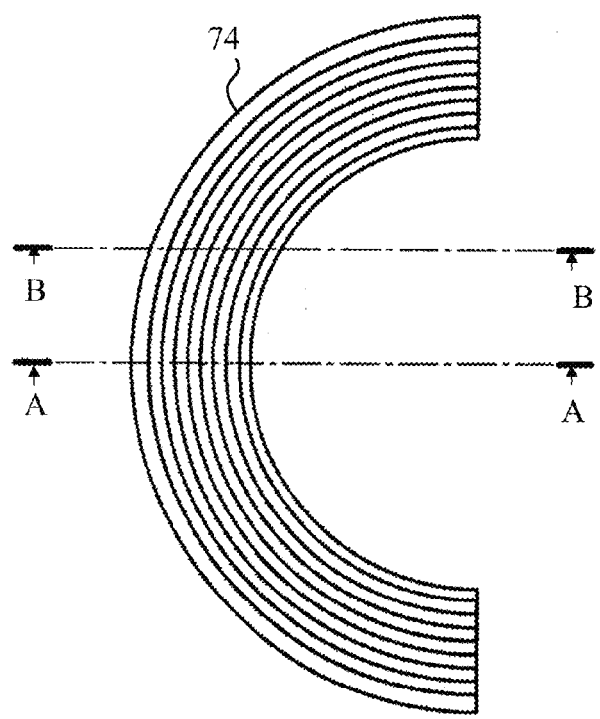
FIGS. 31A to 31C show a prism diffusing panel used in the illumination apparatus which is Embodiment 2 of the present invention.

FIG. 31A shows a prism diffusing panel 74 as an optical member used in an illumination apparatus which is Embodiment 2 of the present invention. The prism diffusing panel 74 is used instead of the prism panel 34 and the light diffusing panel 35 in the illumination apparatus described in Embodiment 1.

Figures 31B, 31C:
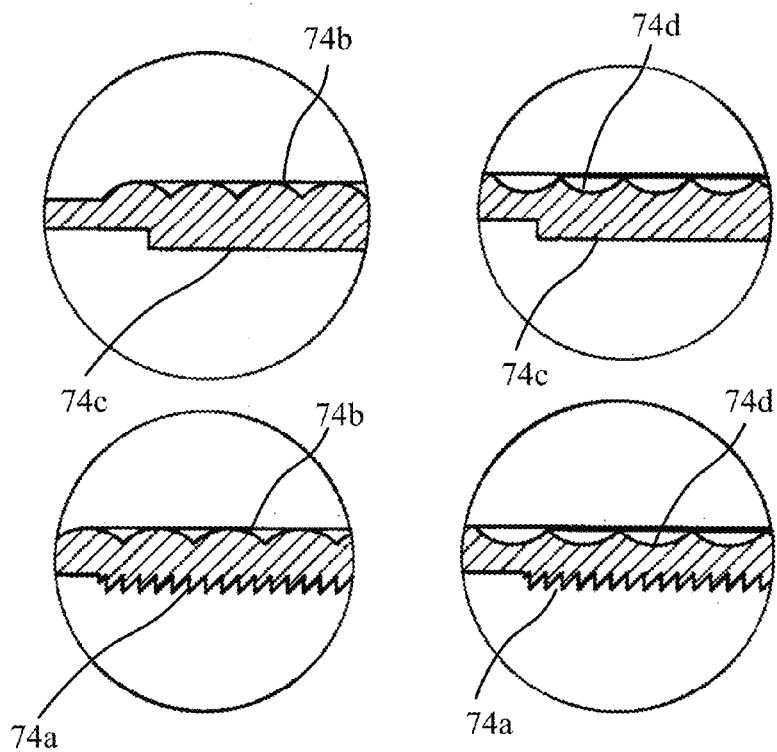

On an entrance surface (light source side surface) of the prism diffusing panel 74, as shown in the lower figure of FIG. 31B (sectional view along a B-B line in FIG. 31A), a prism array 74a similar to the prism arrays 34a and 34b described in Embodiment 1 is formed. An area 74c of the entrance surface of the prism diffusing panel 74 which is an area facing the light source side reflective surface 33c described in Embodiment 1 is not provided with prism portions as shown in the upper figure of FIG. 31B (sectional view along an A-A line in FIG. 31A).

On the other hand, on an exit surface of the prism diffusing panel 74, multiple cylindrical lenses 74b extending in the circumferential direction CC concentrically are formed over the entire exit surface. Each of the cylindrical lenses 74b has a convex toward the light projecting direction L. The cylindrical lenses 74b uniformly diffuse light exiting from the prism diffusing panel 74 and proceeding to the light projecting direction L in a light projection range suitable for micro photography.

As shown in FIG. 31C, multiple cylindrical lenses 74d concave toward the light projecting direction L may be formed on the exit surface of the prism diffusing panel 74 so as to extend in the circumferential direction CC concentrically.

In such way, this embodiment uses the prism diffusing panel 74 whose entrance surface is provided with the prism array 74a which changes directions of light rays and whose exit surface is provided with the cylindrical lenses 74b and 74d which diffuse the light rays. Thereby, as compared with the case where the two optical members (the prism panel 34 and the light diffusing panel 35) are layered in the thickness direction as in Embodiment 1, the illumination apparatus of this embodiment can be made thinner.

Instead of the prism diffusing panel 74 of this embodiment, a prism panel formed of an opalescent optical material having a light diffusion property described in Reference example 2 may be used.

Embodiment 3

Next, as description of Embodiment 3 of the present invention, description will be made of a relation between the electronic components mounted on the mount substrate 39 and the arc reflector 33 in the illumination apparatus of Embodiment 1 (or Embodiment 2) with reference to FIGS. 32 to 36. In this embodiment, constituent elements identical to those in Embodiment 1 are denoted by reference numerals same as those in Embodiment 1, and their description is omitted.

Figure 32:
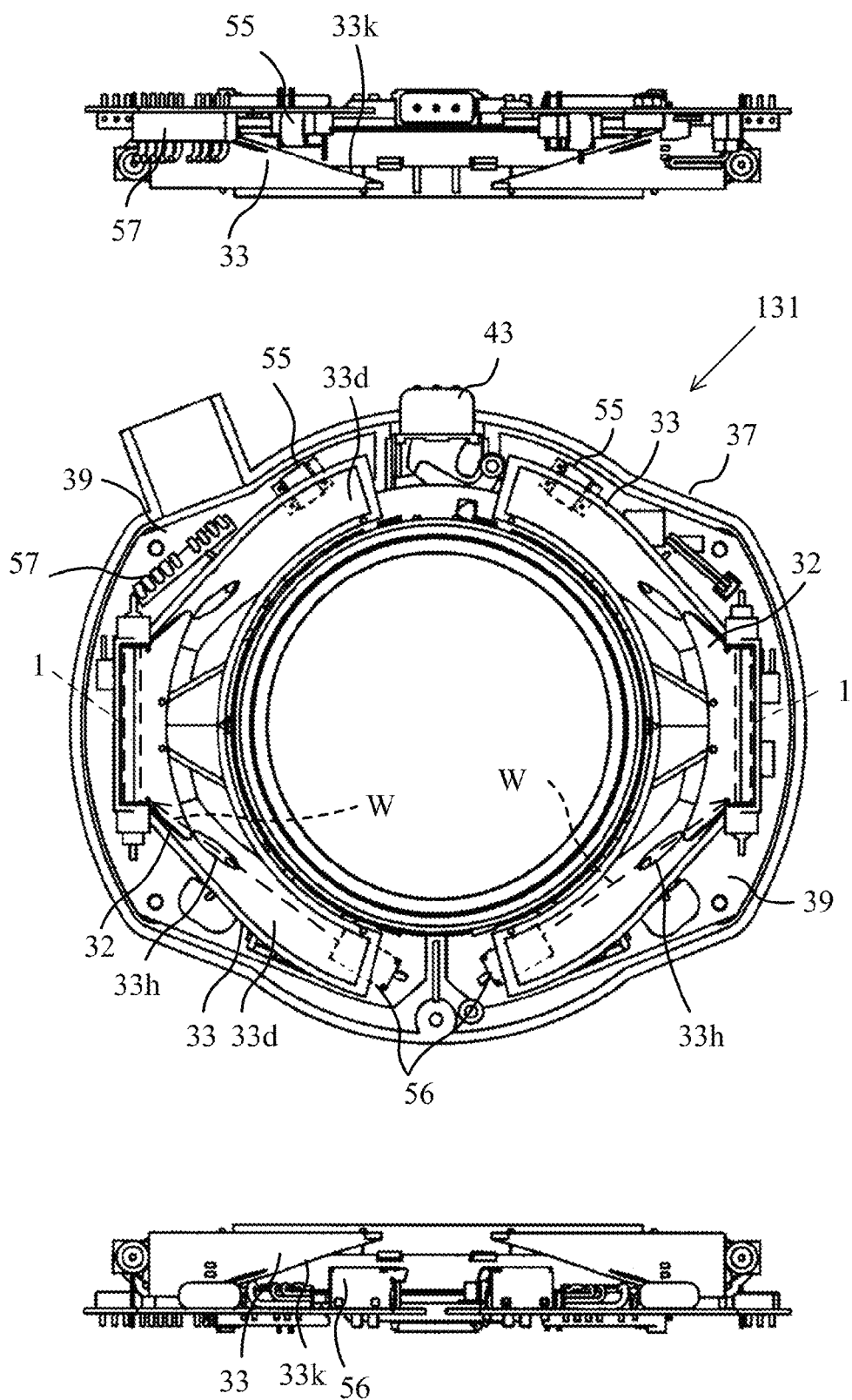
FIG. 32 shows a front view, a top view and a bottom view of an internal configuration of an illumination apparatus which is Embodiment 3 of the present invention.

FIG. 32 shows the internal configuration of the illumination apparatus 131 also shown in FIGS. 22 and 23 in Embodiment 1 and shows arrangement of the electronic components on two mount substrates 39. Each of the two mount substrates 39 respectively provided for the two light sources 1 is disposed on the back side (opposite side to the light projecting direction (L) side in the thickness direction) of the arc reflector 33 provided for the corresponding light source 1.

Reference numeral 55 is a trigger coil to start light emission (discharge) of the light source 1. The trigger coil 55 is mounted on each of the two mount substrates 39 provided for the two light sources 1. Reference numeral 56 is a light-receiving sensor to monitor (detect) a light amount emitted from the light source 1. The light-receiving sensor 56 is mounted on each of the two mount substrates 39. Reference numeral 57 denotes a connector. The connector 57 is connected with a plurality of conductive wires in a connection cable to connect the illumination apparatus with the controller (not shown) described in Reference example 1. The connector 57 is mounted on one of the two mount substrates 39. Electric charge from a trigger capacitor in the controller flows into the trigger coil via the connection cable and the connector 57. Further, the output from the light-receiving sensor 56 is sent to the controller via the connector 57 and the connection cable.

An output signal from the light-receiving sensor 56 may be output via another cable in the connection cable and not via the connector 57.

In Embodiment 1, description was made of the backward tilt arrangement of the reflective light collector 32 enabling the thickness reduction of the arc reflector 32 and the arrangement of the other constituent element(s) having a certain amount of volume on the back side of the arc reflector 33. Moreover, in Embodiment 1, description was made of the case where the other constituent element is the lock mechanism. In this embodiment, description will be made of a case where the other constituent elements are the trigger coil 55, the light-receiving sensor 56 and the connector 57 as the electronic components mounted on the mount substrate 39. Although, in Embodiment 1, description was made of the case of providing the retracted portion 33f on the back side of the part of the arc reflector 33 near the light source 1 in order to arrange the lock mechanism. In this embodiment, description will be made of a case where the trigger coils 55, the light-receiving sensor 56 and the connector 57 are arranged on the back side of part of the arc reflector 33 away from the light source 1.

As described in Embodiment 1, each of the arc reflective surfaces 33d is formed, basically, as a surface tilted with respect to the reference plane along the radial direction R so as to be located further forward in the light projecting direction L (that is, so as to increase its height in the light projecting direction L) as being located away from the light source 1 in the circumferential direction CC. Therefore, a back surface 33k of the arc reflective surface 33d of the arc reflector 33 (hereinafter simply referred to as "a the back surface of the arc reflector 33") can also be formed in a similar tilted surface located further away from the mount substrate 39 as being located away from the light source 1 in the circumferential direction CC. Moreover, since the arc reflective surface 33d is a spiral surface without twist, a distance (height) between the mount substrate 39 and the back surface 33k of the arc reflector 33 can be made larger as compared with the case where the arc reflective surface 33d is formed as a twisted spiral surface as in Reference example 2. Furthermore, since the reflective light collector 32 is arranged in the backward tilt arrangement and the thickness of the arc reflector 33 is reduced, the height between the mount substrate 39 and the back surface 33k of the arc reflector 33 can be made higher than in a case where the reflective light collector 32 is not arranged in the backward tilt arrangement and the thickness of the arc reflector 33 is not reduced.

Therefore, in an arc reflective surface back space which is a space between the back surface 33k of the arc reflector 33 and the mount substrate 39 (space facing the back surface 33k of the arc reflector 33 in the thickness direction) and has a large height, at least one of electronic components mounted on the mount substrate 39 and each having a large height can be arranged. That is, at least one of the trigger coil 55, the light-receiving sensor 56 and the connector 57 each having a large height among the electronic components can be arranged in the arc reflective surface back space. Thereby, increase in size of the illumination apparatus in the radial direction R due to shifting the trigger coil 55, the light-receiving sensor 56 and the connector 57 with respect to the arc reflector 33 in the radial direction R can be prevented. Even if the illumination apparatus has a reduced thickness, a sufficient height for mounting the trigger coil 55, the light-receiving sensor 56 and the connector 57 can be ensured as the arc reflective surface back space. Therefore, a thin shape of the illumination apparatus can be maintained.

That is, according to this embodiment, since large size electronic components such as the trigger coil 55, the light-receiving sensor 56 and the connector 57 can be efficiently arranged in the space on the back side of the arc reflector 33, the illumination apparatus can be sufficiently downsized.

Since noise is generated in the trigger coil due to energization thereof, the light-receiving sensor 56 is likely to be affected by the noise if the trigger coil 55 and the light-receiving sensor 56 are arranged close to each other. Therefore, this embodiment efficiently uses two arc reflective surface back spaces formed between the back surfaces of the two arc reflective surface 33d of the arc reflector 33 and the mount substrate 39, that is, the two arc reflective surface back spaces formed on both sides of the light source 1 opposite to each other in the radial direction R. That is, the trigger coil 55 is disposed in one of the two arc reflective surface back spaces and the light-receiving sensor 56 is disposed in the other arc reflective surface back space to make a distance between the trigger coil 55 and the light-receiving sensor 56 in the radial direction R large as much as possible.

In FIG. 32, the trigger coil 55 and the connector 57 are arranged in the arc reflective surface back space formed on an upper side further than the light source 1 in the figure, and the light-receiving sensor 56 is arranged in the arc reflective surface back space on a lower side further than the light source 1.

Figure 33:
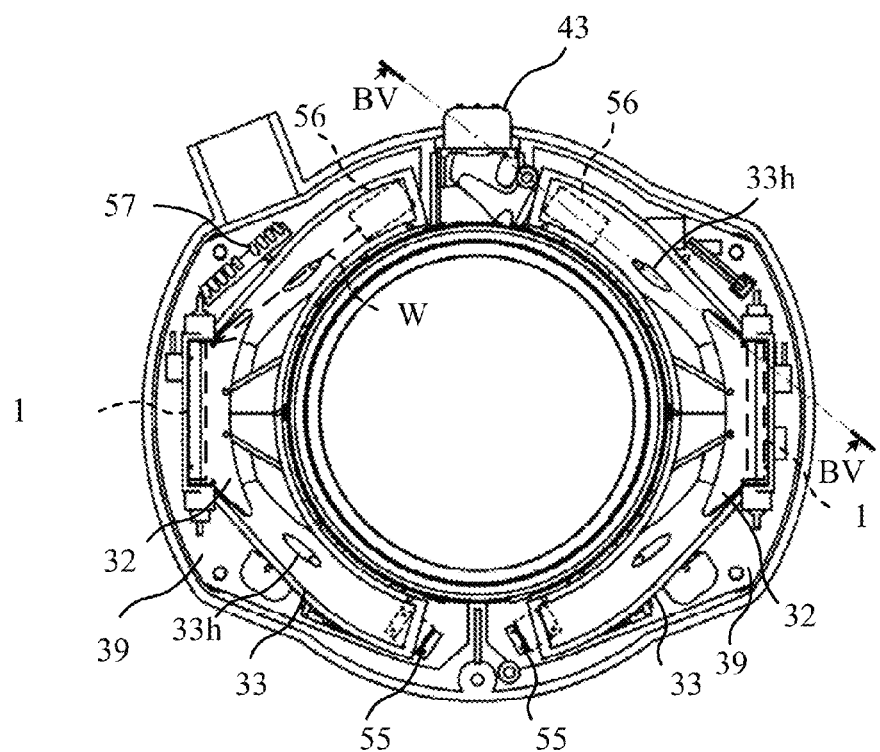
FIG. 33 is a front view showing an internal configuration of an illumination apparatus as a modified example of Embodiment 3.

In FIG. 33 showing a modified example, the light-receiving sensor 56 and the connector 57 are arranged in the arc reflective surface back space on an upper side further than the light source 1 in the figure, and the trigger coil 55 is arranged in the arc reflective surface back space on a lower side further than the light source 1.

Figure 34:
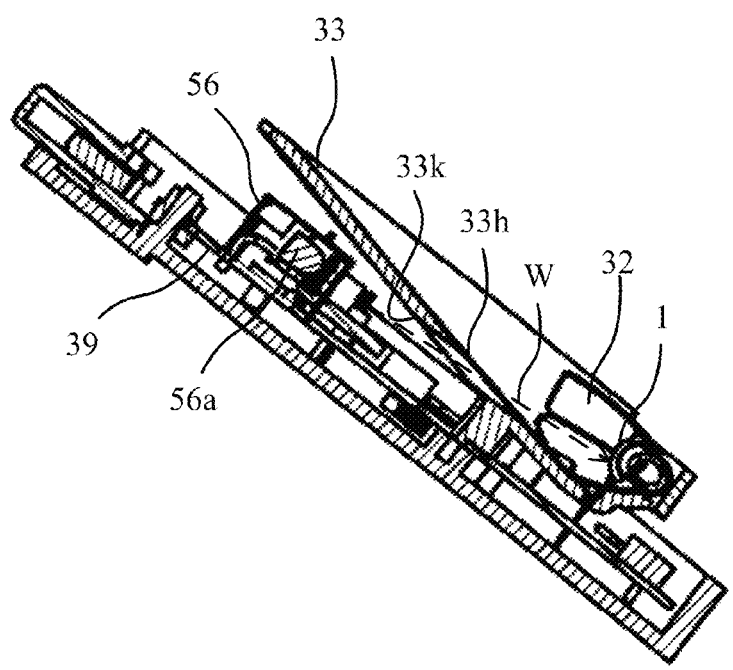
FIG. 34 is a sectional view of the illumination apparatus shown in FIG. 33.

In the configuration shown in any one of FIGS. 32 and 33, the arc reflector 33 (arc reflective surface 33d) exists between the light-receiving sensor 56 and the light source 1 whose light amount is to be monitored by the light-receiving sensor 56. Therefore, in this embodiment, as also shown in FIG. 34 (sectional view along a BV-BV line in FIG. 33), a through hole 33h is formed in a portion where the arc reflective surface 33d is formed in the arc reflector 33 (portion between the arc reflective surface 33d and the back surface 33k). The through hole 33h is opened in the arc reflective surface 33d and in the back surface 33k. The light-receiving sensor 56 is mounted on the mount substrate 39 after its direction is decided so that the light from the light sources 1 reaches the light-receiving portion (photodiodes) 56a of the light-receiving sensor 56 through the through hole 33h. An arrow W in the figure indicates that a line connecting the light-receiving portion 56a and the through hole 33h extends toward the light source 1 through the light exit opening of the reflective light collector 32. According to this configuration, even in the case where the light-receiving sensor 56 is arranged in the arc reflective surface back space, good monitoring of the light amount of the light source 1 by the light-receiving sensor 56 can be performed.

Figure 35:
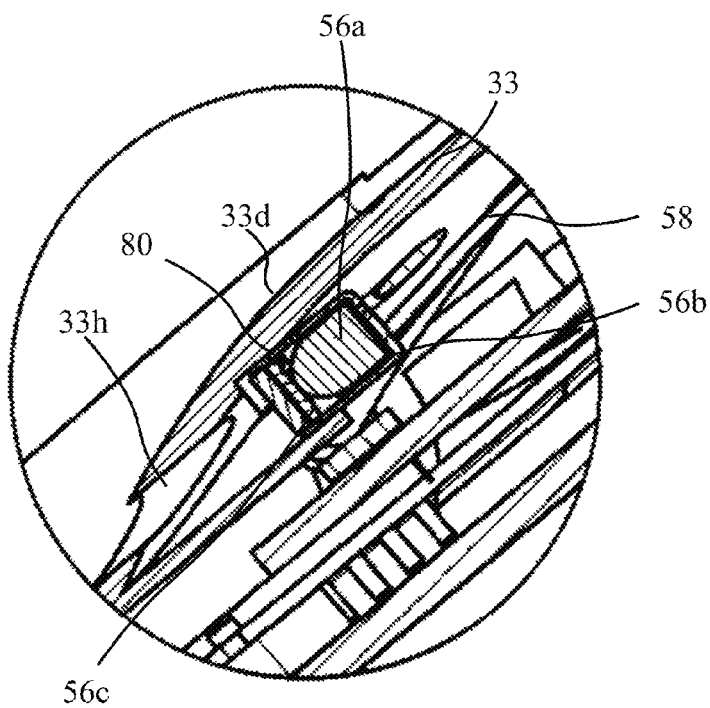
FIG. 35 is a partial sectional view of an illumination apparatus as another modified example of Embodiment 3.

FIG. 35 shows a modified example of the configuration shown in FIG. 34. In this modified example, the light-receiving sensor 56 is not mounted on the mount substrate 39, and the light-receiving portion 56a is separated from a main body of the sensor 56; the light-receiving portion 56a is connected to the main body via a cable 58 inside the connection cable 102 shown in FIG. 1. The light-receiving portion 56a is inserted into a cylindrical shielding member 56b with pressure together with a filter 56c to reduce a light amount reaching from the light source 1 and thereby is held by the cylindrical shielding member 56b. The cylindrical shielding member 56b inside which the light-receiving portion 56a and the filter 56a are inserted is inserted into the through hole 33h formed in the arc reflector 33 with pressure and held by the arc reflector 33 with an adhesive. According to this configuration, as compared with the configuration shown in FIG. 34, a distance between the light-receiving portion 56a and the light source 1 can be made shorter. Moreover, since the light-receiving sensor 80 is held in the through hole 33h of the arc reflector 33, there is no possibility that unstable light amount monitoring occur due to misalignment of the through hole 33h and the light-receiving sensor 80, which may occur in the configuration shown in FIG. 34. Therefore, better monitoring of the light amount of the light source 1 can be performed.

Figure 36:
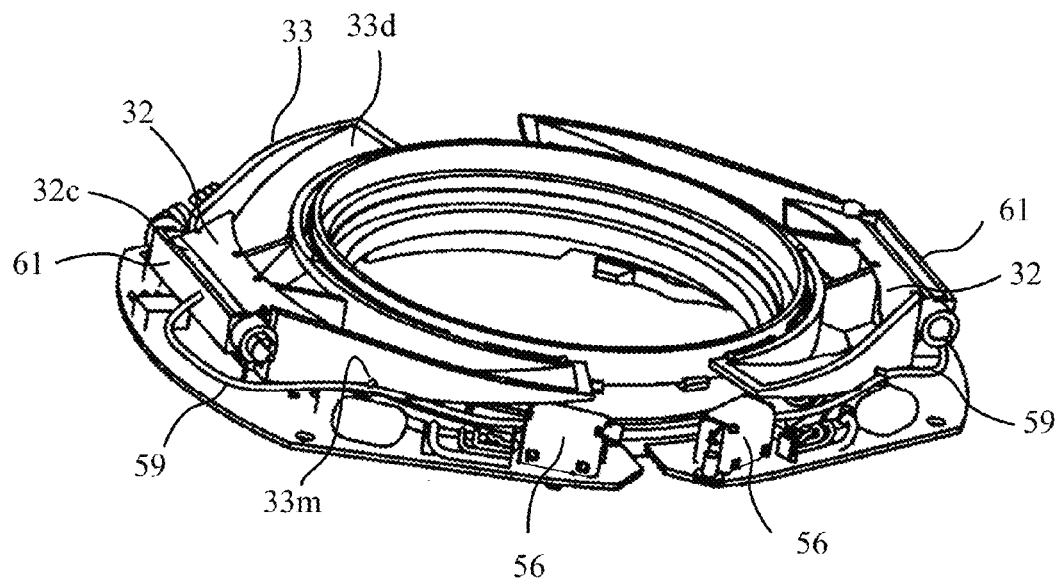
FIG. 36 is a schematic view of an illumination apparatus as further another modified example of Embodiment 3.

FIG. 36 shows another modified example. In this modified example, the light-receiving sensor 56 (including the light-receiving portion) is mounted on the mount substrate 39, and the light from the light source 1 is guided to the light-receiving sensor 56 via an optical fiber 59 inserted in a hole formed in the half cylindrical portion 32c of the reflective light collector 32. The optical fiber 59 is held by an elastic holder 61 fixating the light source 1 to the reflective light collector 2 and a holding portion 33m formed on an outer circumferential surface of the outer circumferential wall portion of the arc reflector 33. The optical fiber 59 may be inserted from a side surface of the reflective light collector 32 (one surface in the longitudinal direction of the light source 1). According to this configuration, since the through hole 33h does not need to be formed in the arc reflectors 33, which needs in the configurations shown in FIGS. 34 and 35, even a slight unevenness in light amount of the illumination light due to the through hole 33h can be prevented.

Figure 37:
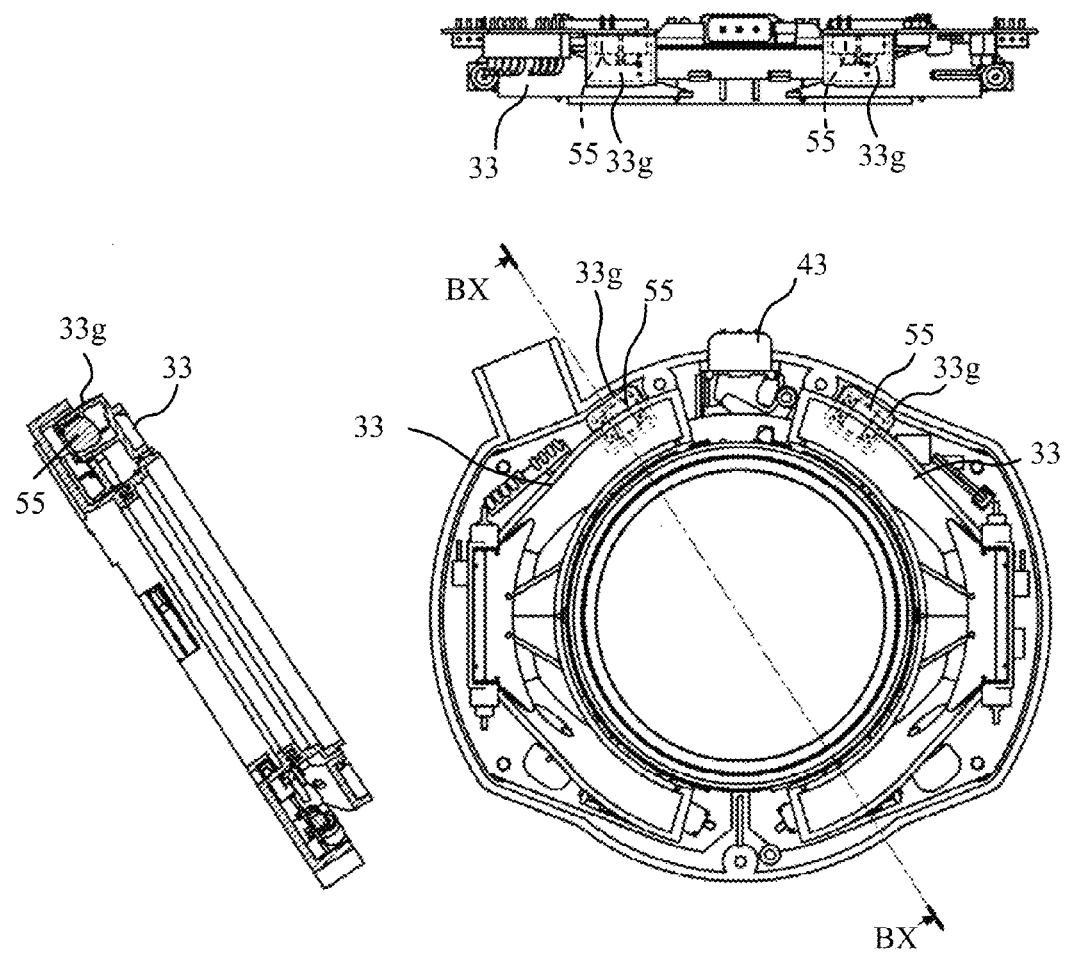
FIG. 37 shows a front view, a top view and a sectional view of an illumination apparatus as still further another modified example of Embodiment 3.

FIG. 37 shows a configuration to further reduce influence of the noise occurring from the trigger coil 55 as compared with the configurations shown in FIGS. 32 and 33. The left figure of FIG. 37 shows a sectional view along a BX-BX line in the center figure of FIG. 37. Reference numeral 33g denotes a wall portion which covers the surrounding of the trigger coil 55 mounted on the mount substrate 39; the wall portion 33g is integrally formed with the arc reflector 33. Covering the trigger coil 55 by the wall portion 33g increases a creepage distance for the trigger coil 55, so that the influence of the noise generated from the trigger coil 55 on the light-receiving sensor 56 can be prevented more surely as compared with the configurations shown in FIGS. 32 and 33.

In Embodiments 1 to 3, description was made of the configuration based on the illumination apparatus of Reference example 2. However, the configurations described in Embodiments 1 to 3 may be applied to the illumination apparatus described in Reference example 1.

According to each of the above embodiments, the reflection of the light from the light source by the first reflective surface enables forming the light exit portion extending to the circumferential direction, without using a curved-tubular light source. Furthermore, guiding part of the light from the light source to the circumferential direction by the second reflective surface enables the light from the light source to uniformly exit from the light exit portion. Thereby, an illumination apparatus can be achieved which is capable of efficiently utilizing the light from the light source and performing uniform illumination suitable for micro photography.

Moreover, according to Embodiments 1 and 2, a direction of the light collector is set to a direction suited for downsizing (reducing the thickness) of the illumination apparatus, so that sufficient downsizing of the illumination apparatus can be realized.

Furthermore, according to Embodiment 3, since large size electronic components such as the trigger coil, light-receiving sensor and connector can be efficiently arranged in the space formed on the back side of the reflector, sufficient downsizing of the illumination apparatus can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-012142 and 2013-012272, filed Jan. 25, 2013 which are hereby incorporated by reference herein in their entirety.

What is claimed is:

1. An illumination apparatus, which is arrangeable so as to surround an image capturing lens, the illumination apparatus comprising, when, in a state where the illumination apparatus is arranged so as to surround the image capturing lens, a direction corresponding to a radial direction of the image capturing lens is defined as a radial direction of the illumination apparatus, a direction surrounding the image capturing lens is defined as a circumferential direction of the illumination apparatus, a direction toward an object field to be captured through the image capturing lens is defined as a light projecting direction of the illumination apparatus, and a direction along an optical axis of the image capturing lens is defined as a thickness direction of the illumination apparatus:
   a light source;
   a light collector configured to direct light, which diverges from the light source, inward further than the light source in the radial direction by using a reflective surface; and
   a light guider provided inside further than the light source in the radial direction so as to extend in the circumferential direction and configured to guide the light from the light source toward an area extending to a side away from the light source in the circumferential direction and to cause the light from the light source to exit toward the light projecting direction,
   wherein the light collector includes (a) two reflective surfaces each as the reflective surface on a light projecting direction side further than the light source and on an opposite side thereto in the thickness direction and (b) a light exiting opening between the two reflective surfaces,
   wherein the light collector is configured so that, in a sectional plane along the thickness direction, a direction of a center of an exit range of the light exiting through the light exiting opening tilts to the opposite side to the light projecting direction side inward in the radial direction, and wherein in the light collector, of the two reflective surfaces, at least part of one reflective surface provided on the opposite side to the light projecting direction side has a shorter length from the light source in the radial direction than that of the other reflective surface provided on the light projecting direction side.

2. An illumination apparatus according to claim 1, wherein, in the light collector, of the two reflective surfaces, one reflective surface provided on the opposite side to the light projecting direction side has a shorter length from the light source in the radial direction than that of the other reflective surface provided on the light projecting direction side.

3. An illumination apparatus according to claim 1, wherein, in the light collector, the reflective surface provided on the opposite side to the light projecting direction side is receded at least part of its radially inner edge.

4. An illumination apparatus according to claim 1, wherein, in the light collector, of the two reflective surfaces, part of one reflective surface provided on the opposite side to the light projecting direction side has a shorter length from the light source in the radial direction than that of another part of the one reflective surface.

5. An illumination apparatus according to claim 1, further comprising a light exiting portion provided on the light projecting direction side further than the light guider, where the light exits toward the object field and which has an arc shape or a ring shape,
wherein, in the light collector, a radially inner edge of the other reflective surface provided on the light projecting direction side has, in the circumferential direction, an arc shape along an outer circumference of the light exiting portion.

6. An illumination apparatus according to claim 1, wherein the light guider includes (a) a first reflective surface reflecting the light from the light source to the light projecting direction and (b) a second reflective surface reflecting part of light that proceeds from the light source toward a portion of the first reflective surface facing the light source, toward an area extending to a side away from the light source in the circumferential direction along the first reflective surface.

7. An illumination apparatus according to claim 1, wherein the light source has a straight tubular shape or a linear shape whose longitudinal direction is a tangent direction to the circumferential direction.

8. An illumination apparatus according to claim 1, wherein the illumination apparatus is attachable to and detachable from the image capturing lens and is supported by attachment to the image capturing lens so as to surround the image capturing lens.

9. An illumination apparatus according to claim 1, wherein:
the illumination apparatus is attachable to and detachable from the image capturing lens and is supported by attachment to the image capturing lens so as to surround the image capturing lens;
the illumination apparatus further comprises a lock mechanism configured to hold a state of being supported by the attachment to the image capturing lens;
the light guider includes, at a back side of the first reflective surface, a retracted portion where its radially inside part is formed so as to be located on a light projecting direction side further than its radially outside part; and
the lock mechanism is arranged in an area facing the retracted portion.

10. An illumination apparatus according to claim 6, wherein the portion of the first reflective surface facing the light source has a tilt angle smaller than 45 degrees with respect to the radial direction.

11. An illumination apparatus, which is arrangeable so as to surround an image capturing lens, the illumination apparatus comprising, when, in a state where the illumination apparatus is arranged so as to surround the image capturing lens, a direction corresponding to a radial direction of the image capturing lens is defined as a radial direction of the illumination apparatus, a direction surrounding the image capturing lens is defined as a circumferential direction of the illumination apparatus, a direction toward an object field to be captured through the image capturing lens is defined as a light projecting direction of the illumination apparatus, and a direction along an optical axis of the image capturing lens is defined as a thickness direction of the illumination apparatus:
a light source;
a light collector configured to direct light, which diverges from the light source, inward further than the light source in the radial direction by using a reflective surface; and
a light guider provided inside further than the light source in the radial direction so as to extend in the circumferential direction and configured to guide the light from the light source toward an area extending to a side away from the light source in the circumferential direction and to cause the light from the light source to exit toward the light projecting direction,
wherein the light collector includes two reflective surfaces each as the reflective surface on a light projecting direction side further than the light source and on an opposite side thereto in the thickness direction, the two reflective surfaces having shapes along two surfaces symmetric with each other with respect to a plane of symmetry passing through the light source,
wherein the light collector is configured so that the plane of symmetry tilts to the opposite side to the light projecting direction side inward in the radial direction, and
wherein in the light collector, of the two reflective surfaces, at least part of one reflective surface provided on the opposite side to the light projecting direction side has a shorter length from the light source in the radial direction than that of the other reflective surface provided on the light projecting direction side.

12. An illumination apparatus according to claim 11, wherein, in the light collector, of the two reflective surfaces, one reflective surface provided on the opposite side to the light projecting direction side has a shorter length from the light source in the radial direction than that of the other reflective surface provided on the light projecting direction side.

13. An illumination apparatus according to claim 11, wherein, in the light collector, the reflective surface provided on the opposite side to the light projecting direction side is receded at least part of its radially inner edge.

14. An illumination apparatus according to claim 11, wherein, in the light collector, of the two reflective surfaces, part of one reflective surface provided on the opposite side to the light projecting direction side has a shorter length from the light source in the radial direction than that of another part of the one reflective surface.

15. An illumination apparatus according to claim 11, wherein the light guider includes (a) a first reflective surface reflecting the light from the light source to the light projecting direction and (b) a second reflective surface reflecting part of light that proceeds from the light source toward a portion of the first reflective surface facing the light source, toward an area extending to a side away from the light source in the circumferential direction along the first reflective surface.

16. An illumination apparatus according to claim 11, wherein the light source has a straight tubular shape or a linear shape whose longitudinal direction is a tangent direction to the circumferential direction.

17. An illumination apparatus according to claim 11, wherein the illumination apparatus is attachable to and detachable from the image capturing lens and is supported by attachment to the image capturing lens so as to surround the image capturing lens.

18. An illumination apparatus according to claim 11, wherein:
the illumination apparatus is attachable to and detachable from the image capturing lens and is supported by attachment to the image capturing lens so as to surround the image capturing lens;
the illumination apparatus further comprises a lock mechanism configured to hold a state of being supported by the attachment to the image capturing lens;
the light guider includes, at a back side of the first reflective surface, a retracted portion where its radially inside part is formed so as to be located on a light projecting direction side further than its radially outside part; and
the lock mechanism is arranged in an area facing the retracted portion.

19. An illumination apparatus according to claim 12, further comprising a light exiting portion provided on the light projecting direction side further than the light guider, where the light exits toward the object field and which has an arc shape or a ring shape,
wherein, in the light collector, a radially inner edge of the other reflective surface provided on the light projecting direction side has, in the circumferential direction, an arc shape along an outer circumference of the light exiting portion.

20. An illumination apparatus according to claim 15, wherein the portion of the first reflective surface facing the light source has a tilt angle smaller than 45 degrees with respect to the radial direction.

21. An illumination apparatus comprising:
a first reflective portion formed to have an arc shape;
a light source arranged outside further than the first reflective portion in a radial direction of the first reflective portion;
a light collector configured to direct light, which diverges from the light source, inward further than the light source in the radial direction by using a reflective surface;
a second reflective portion reflecting the light from the light source to a side away from the light source in a circumferential direction of the first reflective portion; and
an exit portion where the light reflected by the first reflective portion exits,
wherein the light collector includes, in a direction orthogonal to a plane along the radial direction, (a) a first surface provided on a closer side to the exit portion than the light source and (b) a second surface provided on a farther side from the exit portion than the light source, and
wherein the second surface has, with respect to a plane passing through the light source along the radial direction, a larger opening angle toward the direction orthogonal to the plane along the radial direction than that of the first surface.

22. An illumination apparatus according to claim 21, wherein, in the light collector, the second surface has a shorter length from the light source in the radial direction than that of the first surface.

23. An illumination apparatus according to claim 21, wherein, in the light collector, the second surface is receded at least part of its radially inner edge.

24. An illumination apparatus according to claim 21, wherein, in the light collector, at least part of the second surface has a shorter length from the light source in the radial direction than that of the first surface.

25. An illumination apparatus according to claim 21, wherein, in the light collector, part of the second surface has a shorter length from the light source in the radial direction than that of another part of the second surface.

26. An illumination apparatus according to claim 21, wherein the exit portion has an arc shape or a ring shape.

27. An illumination apparatus according to claim 21, wherein a portion of the first reflective surface facing the light source has a tilt angle smaller than 45 degrees with respect to the radial direction.

28. An illumination apparatus according to claim 21, wherein the light source has a straight tubular shape or a linear shape whose longitudinal direction is a tangent direction to the circumferential direction.

29. An illumination apparatus according to claim 21, wherein the illumination apparatus is attachable to and detachable from the image capturing lens and is supported by attachment to the image capturing lens so as to surround the image capturing lens.

30. An illumination apparatus according to claim 21, wherein:
the illumination apparatus is attachable to and detachable from the image capturing lens and is supported by attachment to the image capturing lens so as to surround the image capturing lens;
the illumination apparatus further comprises a lock mechanism configured to hold a state of being supported by the attachment to the image capturing lens;
the first reflective portion includes, at a back side thereof, a retracted portion where its radially inside part is formed so as to be located on an exit portion side further than its radially outside part; and
the lock mechanism is arranged in an area facing the retracted portion.

31. An illumination apparatus comprising:
a first reflective portion formed to have an arc shape;
a light source arranged outside further than the first reflective portion in a radial direction of the first reflective portion;
a second reflective portion reflecting light from the light source to a side away from the light source in a circumferential direction of the first reflective portion; and
an exit portion where the light reflected by the first reflective portion exits,
wherein:
the first reflective portion reflects the light from the light source and the light from the second reflective portion toward the exit portion;
the first reflective portion is formed so as to be located closer to the exit portion as being located further away from the light source in the circumferential direction; and
in a space facing an opposite side surface of the first reflective portion to an exit portion side surface thereof in a thickness direction of the first reflective portion, at least one of a trigger coil to start light emission of the light source, a light-receiving sensor to detect a light emission amount of the light source and a connector to which a cable making connection to the illumination apparatus is connected is provided.

32. An illumination apparatus according to claim 31, further comprising:
a light collector configured to direct the light, which diverges from the light source, inward further than the light source in the radial direction by using a reflective surface,
wherein the light collector includes (a) two reflective surfaces each as the reflective surface on an exit portion side further than the light source and on an opposite side thereto in the thickness direction and (b) a light exiting opening between the two reflective surfaces, and
the light collector is configured so that, in a sectional plane along the thickness direction, a direction of a center of an exit range of the light exiting through the light exiting opening tilts to the opposite side to the exit portion side inward in the radial direction.

33. An illumination apparatus according to claim 32, wherein a portion of the first reflective portion facing the light source has a tilt angle smaller than 45 degrees with respect to the radial direction.

34. An illumination apparatus according to claim 31, further comprising:
a light collector configured to direct the light, which diverges from the light source, inward further than the light source in the radial direction by using a reflective surface,
wherein the light collector includes two reflective surfaces each as the reflective surface on an exit portion side further than the light source and on an opposite side thereto in the thickness direction, the two reflective surfaces having shapes along two surfaces symmetric with each other with respect to a plane of symmetry passing through the light source, and
the light collector is configured so that the plane of symmetry tilts to the opposite side to the exit portion side inward in the radial direction.

35. An illumination apparatus according to claim 34, wherein a portion of the first reflective portion facing the light source has a tilt angle smaller than 45 degrees with respect to the radial direction.

36. An illumination apparatus according to claim 31, further comprising:
a light collector configured to direct the light, which diverges from the light source, inward further than the light source in the radial direction by using a reflective surface,
wherein the light collector includes, in a direction orthogonal to a plane along the radial direction, (a) a first surface provided on a closer side to the exit portion than the light source and (b) a second surface provided on a farther side from the exit portion than the light source, and
wherein the second surface has, with respect to a plane passing through the light source along the radial direction, a larger opening angle toward the direction orthogonal to the plane along the radial direction than that of the first surface.

37. An illumination apparatus according to claim 31, wherein the light source has a straight tubular shape or a linear shape whose longitudinal direction is a tangent direction to the circumferential direction.

38. An illumination apparatus according to claim 31, wherein a hole through which the light from the light source passes toward a light receiving portion of the light-receiving sensor is formed.

39. An illumination apparatus according to claim 31, wherein, on the opposite side of the first reflective portion to the exit portion, a holing portion is provided which holds a light-receiving portion of the light-receiving sensor.

40. An illumination apparatus according to claim 31, wherein the light from the light source is introduced to the light-receiving sensor through an optical fiber.

41. An illumination apparatus according to claim 31, wherein the trigger coil is arranged in the space, and
a member including the first and second reflective portions is provided with a wall portion covering the trigger coil.

42. An illumination apparatus according to claim 31, wherein the illumination apparatus is attachable to and detachable from the image capturing lens and is supported by attachment to the image capturing lens so as to surround the image capturing lens.

* * * * *